US012397930B2

(12) United States Patent
Lake et al.

(10) Patent No.: US 12,397,930 B2
(45) Date of Patent: Aug. 26, 2025

(54) AIRCRAFT MAINTENANCE SYSTEM WITH NO FAULT FOUND PART ALERTS

(71) Applicant: The Boeing Company, Arlington, VA (US)

(72) Inventors: Peter J. Lake, Auburn, WA (US); Steven David Chapman, Chesterfield, MO (US); Jay Kevin McCullough, Belleville, IL (US)

(73) Assignee: The Boeing Company, Arlington, VA (US)

( * ) Notice: Subject to any disclaimer, the term of this patent is extended or adjusted under 35 U.S.C. 154(b) by 358 days.

(21) Appl. No.: 18/164,288

(22) Filed: Feb. 3, 2023

(65) Prior Publication Data

US 2024/0262532 A1    Aug. 8, 2024

(51) Int. Cl.
*B64F 5/60* (2017.01)
*B64D 45/00* (2006.01)

(52) U.S. Cl.
CPC ............... *B64F 5/60* (2017.01); *B64D 45/00* (2013.01); *B64D 2045/0085* (2013.01)

(58) Field of Classification Search
CPC .... B64F 5/60; B64D 45/00; B64D 2045/0085
USPC ...................................................... 701/31.4
See application file for complete search history.

(56) References Cited

U.S. PATENT DOCUMENTS

| | | | |
|---|---|---|---|
| 7,860,618 B2 | 12/2010 | Brandstetter et al. | |
| 8,620,936 B2 | 12/2013 | Lake et al. | |
| 8,825,276 B2 | 9/2014 | Lake et al. | |
| 9,396,592 B2 | 7/2016 | Chapman et al. | |
| 10,013,505 B1 | 7/2018 | Augustine et al. | |
| 11,195,343 B2 | 12/2021 | Lake et al. | |
| 2016/0104125 A1 | 4/2016 | Chapman et al. | |
| 2016/0364285 A1* | 12/2016 | Swayne | G06F 11/0793 |

* cited by examiner

*Primary Examiner* — Isaac G Smith
(74) *Attorney, Agent, or Firm* — Yee & Associates, P.C.

(57) ABSTRACT

A method manages aircraft parts. A determination is made as to whether a no fault found parameter for a part type is greater than a no fault found threshold for an acceptable level for no fault found occurrences for the part type. The no fault found parameter is how often a no fault found for the part type occurs relative to how often that the part type has been removed and replaced. A determination is made as to whether an average fix time parameter is greater than a fix time threshold for a correct part replacement. The average fix time parameter identifies an average amount of time before a replaced part for the part type was replaced again. An alert is generated in response to the no fault found parameter being greater than the no fault found threshold and the average fix time parameter being greater than fix time threshold.

18 Claims, 15 Drawing Sheets

AIRCRAFT MAINTENANCE SYSTEM WITH NO FAULT FOUND PART ALERTS

BACKGROUND INFORMATION

1. Field

The present disclosure relates generally to an improved maintenance system for aircraft and in particular, to a method, apparatus, system, and computer program product for managing aircraft parts.

2. Background

Aircraft maintenance involves performing operations to ensure the continued airworthiness of aircraft. Aircraft maintenance can include, for example, inspection, part replacement, overhaul, modifications, and other operations. These operations can include scheduled inspections. The scheduling of these inspections can occur after a period of time, a selected amount of flight time, or a number of aircraft flights.

In addition to scheduled maintenance, computer systems on an aircraft can be used to indicate when maintenance may be needed. For example, a computer system in an aircraft can be a flight management system that is an onboard multipurpose computer system that can automate in-flight tasks, including in-flight management of a flight plan. The flight management system receives data from sensors for different systems in the aircraft.

For example, data can be received from systems such as a propulsion system, an environmental control system, a hydraulic system, a flight control system, and other systems. The flight management system can include aircraft fault logic and performance analysis processes to determine when a part may need maintenance. A part that is identified as needing maintenance can be removed from the aircraft and replaced with another part.

The removed parts are sent to an inspection facility in which the part is inspected and analyzed to determine what maintenance may be needed on the part. After inspection and performance of any needed maintenance, a part is often returned to a spare parts pool for future use when the maintenance can be performed rather than replacing a part. In some instances, the inspection reveals that no maintenance is needed. This part is marked or labeled as no fault found (NFF). This part is also placed in inventory for reuse in aircraft maintenance.

This process of identifying parts needing maintenance from indications generated by the flight management system in an aircraft can be a time-consuming and expensive process that involves removing a part, replacing a part, performing maintenance, and other operations. Therefore, it would be desirable to have a method and apparatus that takes into account at least some of the issues discussed above such as NFF, as well as other possible issues. Having a method and apparatus that overcomes a technical problem by reducing the amount of maintenance on parts identified by flight management systems can reduce the amount of cost and time needed for maintenance of aircraft.

SUMMARY

An embodiment of the present disclosure provides a method for managing aircraft parts. A computer system determines whether a no fault found parameter for a part type is greater than a no fault found threshold for an acceptable level for no fault found occurrences for the part type. The no fault found parameter is how often a no fault found for the part type occurs relative to a number of times that the part type has been removed and replaced. The computer system determines whether an average fix time parameter is greater than a fix time threshold for a correct part replacement. The average fix time parameter identifies an average amount of time before a replaced part for the part type was replaced again. The computer system generates an alert in response to the no fault found parameter for the part type being greater than the no fault found threshold for the acceptable level for no fault found occurrences for the part type and the average fix time parameter being greater than fix time threshold for the correct part replacement.

Another embodiment of the present disclosure provides an aircraft maintenance system comprising a computer system and a maintenance manager in the computer system. The maintenance manager is configured to determine whether a no fault found parameter for a part type is greater than a no fault found threshold for an acceptable level for no fault found occurrences for the part type. The no fault found parameter is how often a no fault found for the part type occurs relative to a number of times the part type has been removed and replaced. The maintenance manager is configured to determine whether an average fix time parameter is greater than a fix time threshold for a correct part replacement. The average fix time parameter identifiers an average amount of time before a replaced aircraft part for the part type was replaced again. The maintenance manager is configured to generate an alert in response to the no fault found parameter for the part type being greater than the no fault found threshold for the acceptable level for no fault found occurrences for the part type and the average fix time parameter being greater than the fix time threshold for the correct part replacement.

Another embodiment of the present disclosure provides a computer program product for managing aircraft parts. The computer program product comprises a computer readable storage medium having program instructions embodied therewith. The program instructions are executable by a computer system to cause the computer system to perform a method of determining whether a no fault found parameter for a part type is greater than a no fault found threshold for an acceptable level for no fault found occurrences for the part type. The no fault found parameter is how often a no fault found for the part type occurs relative to a number of times the part type has been removed and replaced; determining whether an average fix time parameter is greater than a fix time threshold for a correct part replacement, wherein the average fix time parameter identifying an average amount of time before a replaced part for the part type was replaced again; and generating an alert in response to the no fault found parameter for the part type being greater than the no fault found threshold for the acceptable level for no fault found occurrences for the part type and the average fix time parameter being greater than the fix time threshold for the correct part replacement.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred drawings, wherein:

DETAILED DESCRIPTION

The illustrative embodiments recognize and take into account one or more different considerations. For example, the illustrative embodiments recognize and take into account that aircraft parts are expensive to procure and store in inventory. As a result, aircraft fault logic and troubleshooting procedures are designed to discourage unnecessary removal of parts. Even with these aircraft fault logic and troubleshooting procedures, a shop repair or maintenance facility will often report that a component removed for troubleshooting was identified as no fault found (NFF) after testing.

This component is a no fault found component and can be placed in inventory for a spare parts panel. This process can add costs to airline operations.

Thus, the illustrative embodiments can provide a method, apparatus, system, and computer program product for managing aircraft parts. An analysis of maintenance data can be performed to identify recommendations based on historical maintenance records. For example, identifying the occurrence of no fault found (NFF) parts can be used to determine whether the frequency of the occurrence for particular part types indicate an issue for further resolution. For example, if the percent of parts of a part type pulled for repair have a no fault found result that is greater than a threshold, an alert can be generated. In some cases, the maintenance procedure may need updating because the part that was pulled and identified as no fault found may not be the part that caused the fault indicator to be generated. In another example, the higher incidence of a no fault found part may indicate that the procedures for evaluating the part may be inaccurate and need updating.

Figure 1:
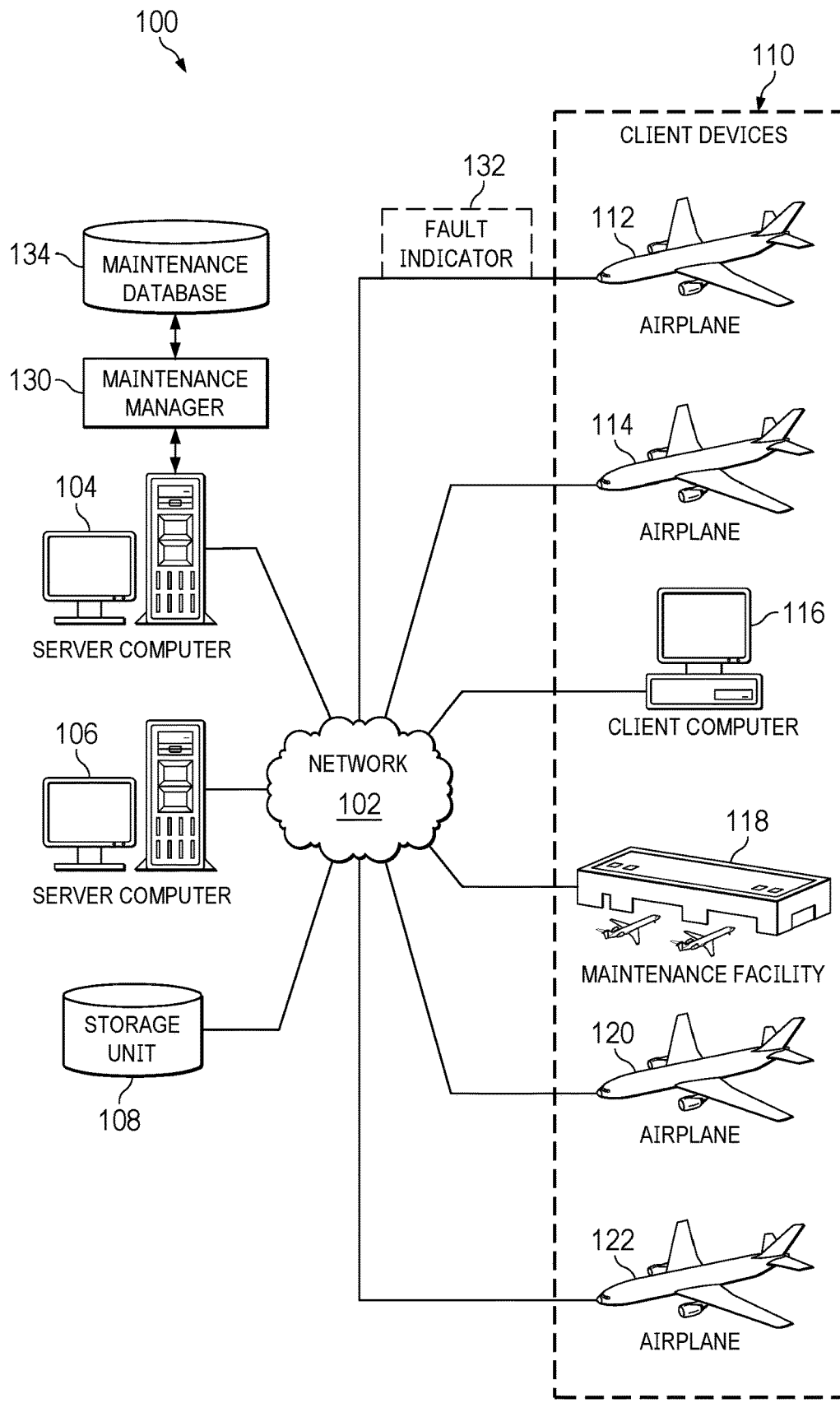
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102.

As depicted, client devices 110 include airplane 112, airplane 114, client computer 116, maintenance facility 118, airplane 120, and airplane 122. In addition to these depicted examples, client devices 110 can be, for example, computers, workstations, network computers, vehicles, ships, buildings, and other objects or structures that contain data processing systems.

In this illustrative example, network 102 is the communications media for these network devices. Some or all of client devices 110 may form an Internet of things (IoT) in which these physical devices can connect to network 102 and exchange information with each other over network 102.

In the depicted example, server computer 104 provides information, such as boot files, operating system images, and applications to client devices 110.

Client devices 110 are clients to server computer 104 in this example. Client devices 110 connect to network 102 utilizing at least one of wired, optical fiber, or wireless connections. Network data processing system 100 can include additional server computers, client computers, aircraft, and other devices not shown.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, maintenance manager 130 is located in server computer 104. Maintenance manager 130 can manage maintenance for client devices 110 such as airplane 112, airplane 114, airplane 120, and airplane 122. Further, maintenance manager 130 can also manage parts used to perform maintenance for these aircraft.

In this illustrative example, maintenance manager 130 can receive information from client devices 110. For example, airplane 112 can send fault indicator 132 to maintenance manager 130. In this example, both indicator 132 is generated by flight management system and airplane 112. In response to receiving fault indicator 132, maintenance manager 130 can schedule maintenance for airplane 112. This maintenance for airplane 112 can be performed at maintenance facility 118.

In one illustrative example, a part can be removed and replaced with a replacement part at maintenance facility 118. In this example, the removed part can be analyzed at maintenance facility 118.

The part removed from airplane 112 can be analyzed at maintenance facility 118 to determine whether an inconsistency is present that prevents performance of the part at a desired level. This desired level can be based on specifications and tolerances for the part. If the part does not have an inconsistency affecting performance of the part, the part can be labeled or designated as no fault found (NFF). In this case, the part can be placed into inventory for use in maintenance operations.

In this illustrative example, maintenance facility 118 can send this information and other records regarding maintenance of parts to maintenance manager 130. This information can be used to manage parts and store historical information about maintenance performed on different aircraft in maintenance database 134.

In this illustrative example, maintenance manager 130 can analyze maintenance information and maintenance database 134. For example, maintenance manager 130 can analyze maintenance information to identify part types that have an occurrence of no fault found indicating that the replacement of the part may not be the cause of the fault indicator initiating the removal and replacement of parts for that part type.

In this illustrative example, maintenance manager 130 can generate alerts indicating that additional analysis may be needed for particular part types. These alerts may identify aircraft parts that have been removed unnecessarily in response to the generation of fault indicators by the aircraft. Alternatively, the alerts may indicate that the analysis of the removed aircraft parts may be faulty.

The illustration of network data processing system 100 is an example of one implementation in for an illustrative example. For example, the aircraft depicted in this figure are commercial passenger airplanes. In other illustrative examples, other types of aircraft may be involved including, for example, cargo airplanes, military airplanes, rotorcraft, or other types of aircraft. As another example, the part can be removed and replaced at another location such as a hanger and sent to maintenance facility 118 for analysis. In another illustrative example, the occurrence of fault indicator 132 may result in multiple parts being removed. In some cases, other removed parts may not have been identified as faulty but had been removed and replaced to reduce future maintenance costs.

Figure 2:
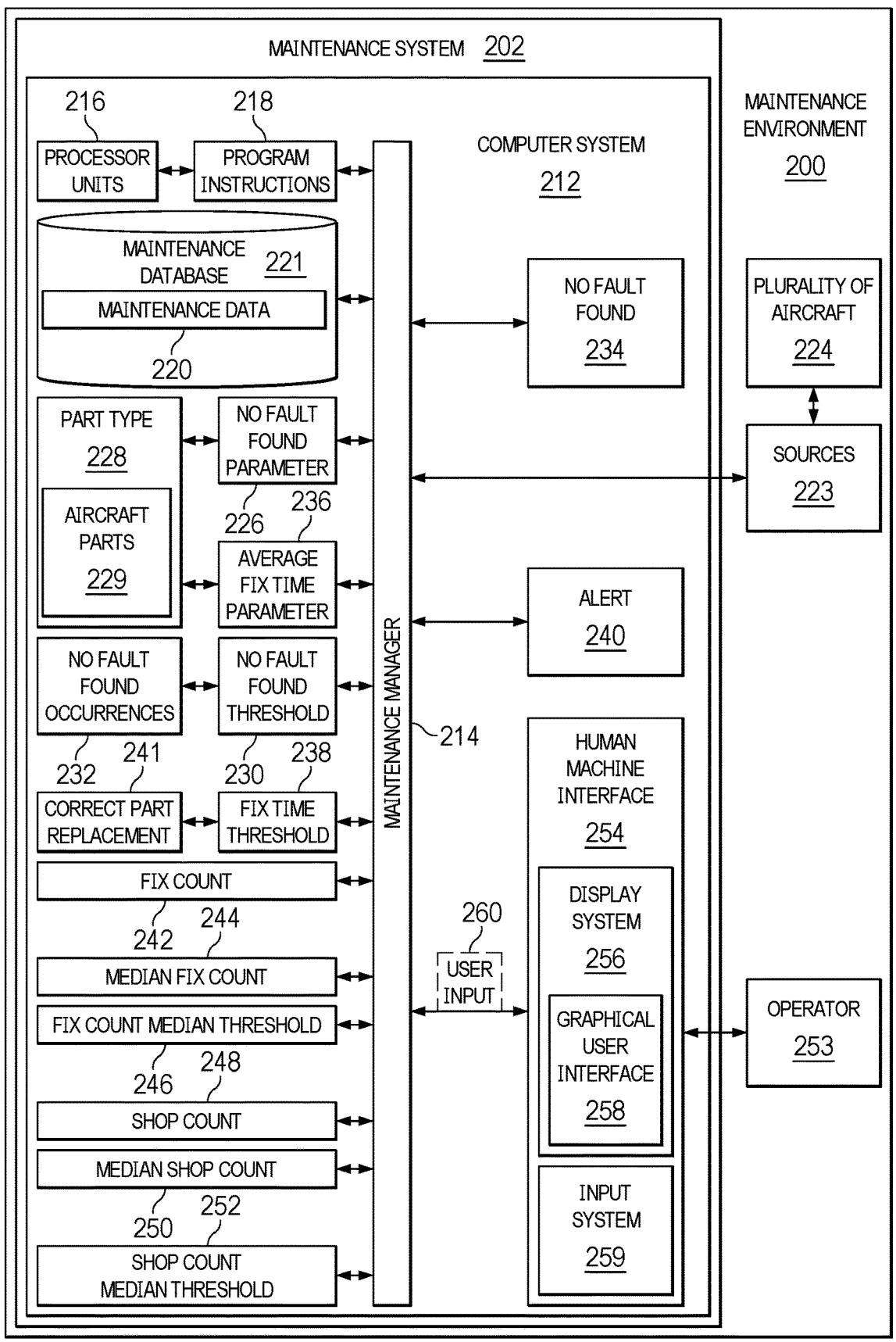
FIG. 2 is a block diagram of a maintenance environment in accordance with an illustrative embodiment.

With reference now to FIG. 2, a block diagram of a maintenance environment is depicted in accordance with an illustrative embodiment. In this illustrative example, maintenance environment 200 includes components that can be implemented in hardware such as the hardware shown in network data processing system 100 in FIG. 1.

In this illustrative example, maintenance system 202 in maintenance environment 200 can operate to manage aircraft parts 229. In this illustrative example, maintenance system 202 comprises computer system 212 and maintenance manager 214.

Maintenance manager 214 can be implemented in software, hardware, firmware or a combination thereof. When software is used, the operations performed by maintenance manager 214 can be implemented in program instructions configured to run on hardware, such as a processor unit.

When firmware is used, the operations performed by maintenance manager 214 can be implemented in program instructions and data and stored in persistent memory to run on a processor unit. When hardware is employed, the hardware can include circuits that operate to perform the operations in maintenance manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer.

When the number of processor units 216 executes program instructions 218 for a process, the number of processor units 216 can be one or more processor units that are on the same computer or on different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

Maintenance manager 214 can use maintenance data 220 for plurality of aircraft 224 to analyze maintenance performed on plurality of aircraft 224 in which parts were pulled and replaced. In this example, plurality of aircraft 224 can be selected from a group comprising an airplane, a commercial airplane, a cargo plane, a rotorcraft, a tilt wing aircraft, an electrical vertical takeoff and landing vehicle, a personal air vehicle, a military aircraft, or other types of aircraft.

Maintenance data 220 is located in maintenance database 221 in this example. Maintenance data 220 relating to maintenance performed on the plurality of aircraft 224 can be obtained from a number of sources 223. For example, maintenance data 220 can be received from at least one of a shop repair facility, a maintenance facility, an airline, or other sources.

In this illustrative example, maintenance data 220 includes information about part types, aircraft parts, fault indicators, dates when fault occurred, maintenance performed, parts removed, parts replaced, and other information relating to the maintenance for plurality of aircraft 224. For example, maintenance data 220 can include shop data from a shop or repair facility. The shop data can identify a part type, whether the part type is a no fault found (NFF) part. The maintenance data can also include parts replaced, tests performed. notes, and other information in this example, maintenance manager 214 analyzes maintenance data 220 for part type 228 from plurality of aircraft 224. In the illustrative example, plurality of aircraft 224 can be aircraft of the same model. Plurality of aircraft 224 can also include variances of that model.

In this illustrative example, aircraft parts 229 of part type 228 are parts that can be used in a location in the aircraft. For example, aircraft parts 229 of part type 228 include various parts in aircraft parts 229 that have the same fit, form, and function but may have different part numbers.

In one illustrative example, maintenance manager 214 determines whether no fault found parameter 226 for part type 228 is greater than no fault found threshold 230 for an acceptable level for no fault found occurrences 232 for part type 228. No fault found parameter 226 is how often no fault found 234 for part type 228 occurs relative to a number of times that part type 228 has been removed and replaced.

In other words, no fault found parameter 226 is a ratio of the number of times aircraft parts 229 for part type 228 were identified as no fault found to the number of times aircraft parts 229 for part type 228 were removed and replaced. This ratio can be expressed as a percentage in some illustrative examples.

In this depicted example, no fault found threshold 230, is selected to indicate when no fault found parameter 226 is considered to be too high to be related to the problem for which maintenance was performed on plurality of aircraft 224. In this example, part type 228 can have no fault found parameter 226 that is too high when the number of parts of part type 228 is great enough that replacing part type 228 is not considered to be the component or part that fixes the problem for which maintenance was performed. As the percentage or ratio of no fault found parameter 226 increases, it becomes more likely that the replacement of an aircraft part of part type 228 is not an actual fix for the problem.

Alternatively, as no fault found parameter 226 increases for part type 228, it can be more likely that the testing procedures for part type 228 may be faulty or unable to detect issues with aircraft parts 229 of part type 228. As a result, the testing of aircraft parts 229 of part type 228 pulled from the plurality of aircraft 224 may have fixed the problem but inconsistencies or other issues with pulled aircraft parts were not identified in the testing of those aircraft parts. In this illustrative example, the threshold can be selected based on analyzing statistical distributions. The threshold can be a percentage that is statistically out of balance from what is considered to be normal for the part.

Maintenance manager 214 determines whether average fix time parameter 236 is greater than fix time threshold 238 for correct part replacement 241. In this example, average fix time parameter 236 is the average amount of time before the replacement aircraft part needs to be replaced again for part type 228. In these examples, average fix time parameter 236 identifies the average amount of time before a replacement part of part type 228 that fixes a problem needs to be replaced again.

In this example, fix time is the amount of time that a particular part in an aircraft lasts before needing to be replaced again in that aircraft. The replacement can be initiated by a fault indicator generated in the aircraft in which the part is located.

The fix time for the different parts in plurality of aircraft 224 is averaged to obtain average fix time parameter 236 for part type 228. In these illustrative examples, the average amount of time can be measured in a number of different ways. For example, the average amount of time can be measured in hours, days, months, or some other period of time. When the amount of time is measured in days, average fix time parameter 236 can be referred to as an average fix days parameter.

As the average amount of time increases with how long aircraft part fixes a problem, it is more likely that the replacement of that aircraft part was a proper fix for the issue resulting from performing the maintenance that pulled and replaced the aircraft part. In this example, fix time threshold 238 is selected to have a value such that confidence is present that the replacement part a resulted in a fix and that another replacement of the aircraft part is not needed within what is considered an expected time for replacing that part. This threshold is intended to make sure the fix for part type 228 does not last for too short of a period of time relative to the amount of time the part type is expected to last. In this example, expected time can be obtained from aircraft part manufacturers. This threshold can be selected to remove data when the replacement did not fix the problem for a time that is considered sufficient count as an issue for no fault found parts.

In this illustrative example, maintenance manager 214 can use these two parameters, no fault found parameter 226, an average fix time parameter 236, to determine whether to generate alert 240. For example, maintenance manager 214 generates alert in response to no fault found parameter 226 for part type 228 being greater than no fault found threshold 230 for the acceptable level for no fault found occurrences 232 for part type 228 and average fix time parameter 236 being greater than fix time threshold 238 for correct part replacement.

In this example, the alert is generated when no fault found parameter 226 is higher than the threshold for this parameter and average fix time parameter 236 is also higher than the threshold for the parameter. When these two parameters are greater than the thresholds, the parameters are considered to be high.

In this example, when the no fault found percentage is high and the average fix time is also high, further investigation is needed. Further investigation is warranted because no fault found parameter 226 indicates that the percentage of aircraft parts 229 of part type 228 that are no fault found parts are higher than expected for that part to fix the problem and average fix time parameter 236 indicates that replacing aircraft parts 229 of part type 228 fixes the problem.

This situation can be present when at least one of replacement of aircraft parts 229 of part type 228 may not be a correct fix or the testing procedures resulting in finding no fault found 234 for part type 228 may not actually identify an issue for part type 228.

In these illustrative examples, maintenance manager 214 can take into account the additional factors in generating alert 240. For example, maintenance manager 214 can determine whether fix count 242 identifying a number of times removal and replacement of aircraft parts 229 of part type 228 fixed a problem is greater than median fix count 244 multiplied with fix count median threshold 246.

In this example, fix count 242 is the number of times that the replacement of a part for part type 228 resulted in fixing the problem. Fix count 242 can be used to track how well replacing an aircraft part fixes a problem at the aircraft or airplane level through identifying how long problem went away.

Each time the part is replaced for a particular airplane, if the fault being repaired stops occurring for a certain number of days, that replacement increments fix count 242 for that aircraft part in that airplane. For example, if a satellite unit for location X is replaced in aircraft A, and the fault being repaired stops occurring for a certain number of days, the fix count is one. The fix count increases to two the next time the satellite unit is replaced for location X in aircraft A, and the fault does not reoccur for a certain number of days.

In this example, the median fix count 244 is a median value for all of the fix counts all of the different parts in the plurality of aircraft 224 for part type 228. The median is the value in the middle of the data set which comprises fix count 242 for all of plurality of aircraft 224.

With taking into account fix count 242, maintenance manager 214 generates alert 240 in response to no fault found parameter 226 for part type 228 being greater than no fault found threshold 230 for the acceptable level for no fault found occurrences 232 for part type 228; average fix time parameter 236 being greater than fix time threshold 238 for correct part replacement 241; and fix count 242 identifying the number of times removal and replacement of parts for the part type fixed the problem being greater than median fix count 244 multiplied with fix count median threshold 246.

As another example, maintenance manager 214 can determine whether shop count 248 identifying a number of times aircraft parts 229 of part type 228 have been removed and replaced is greater than median shop count 250 multiplied with shop count median threshold 252. In this illustrative example, shop count 248 is a number of times aircraft parts 229 of part type 228 have been removed from plurality of aircraft 224 and sent for inspection or testing.

More specifically, shop count 248 can be the number of times a particular part for an aircraft in plurality of aircraft 224 has been removed. In other words, this parameter can identify the number of times a part has been removed and replaced in an aircraft. Median shop count 250 is the median value for shop count 248 for all of plurality of aircraft 224 that use part type 228.

With taking into account shop count 248, maintenance manager 214 generates alert 240 in response to no fault found parameter 226 for part type 228 being greater than no fault found threshold 230 for the acceptable level for no fault found occurrences 232 for part type 228; average fix time parameter 236 being greater than fix time threshold 238 for correct part replacement 241; and shop count 248 identifying a number of times aircraft parts 229 for part type 228 have been removed and replaced being greater than median shop count 250 multiplied with shop count median threshold 252.

In this illustrative example, fix count 242 and shop count 248 can be used to determine whether to consider part type 228 with respect to generating alert 240. These two parameters individually or collectively can be used to determine whether sufficient data is present to consider generating alert 240. In other words, part type 228 can be removed from consideration when the sample size is not sufficiently large to be meaningful. Additionally, both fix count 242 and shop count 248 can be taken into account at the same time in other illustrative examples.

In this illustrative example, alert 240 can be displayed to operator 253 using human machine interface (HMI) 254 in computer system 212. The display of alert 240 can be with other information in maintenance data 220. Further, alert 240 can be specifically displayed in association with information about part type 228 and aircraft parts 229 that are part of part type 228.

In this illustrative example, human machine interface 254 comprises display system 256 and input system 259. Operator 253 interacts with maintenance system 202 using human machine interface 254.

In this illustrative example, display system 256 is a physical hardware system and includes one or more display devices on which graphical user interface 258 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Operator 253 is a person that can interact with graphical user interface 258 through user input 260 generated by input system 259 for computer system 212. Input system 259 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

Figure 3:
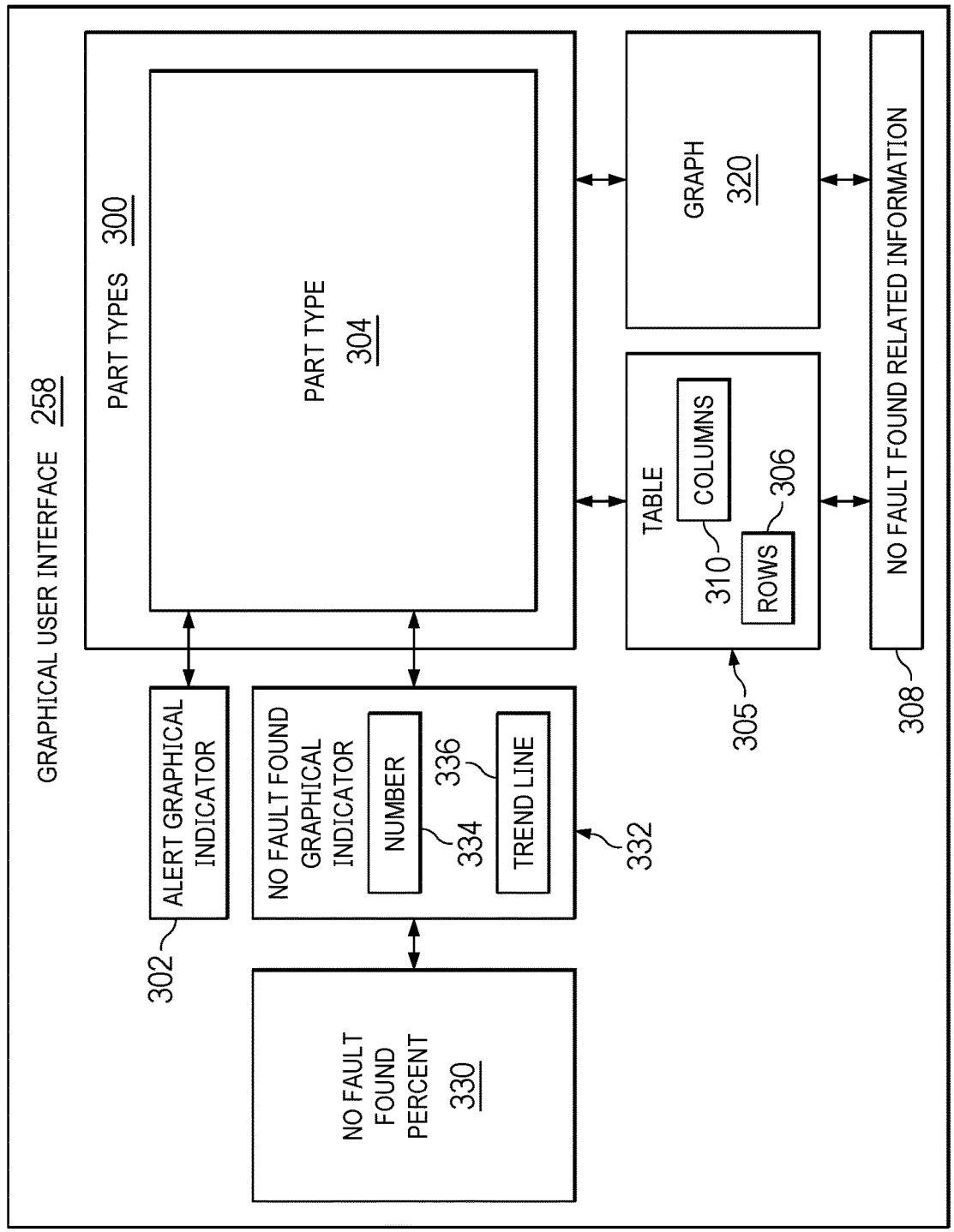
FIG. 3 is an illustration of a block diagram of a graphical user interface for displaying alerts in accordance with an illustrative embodiment.

Turning next to FIG. 3, an illustration of a block diagram of a graphical user interface for displaying alerts is depicted in accordance with an illustrative embodiment. In the illustrative examples, the same reference numeral may be used in more than one figure. This reuse of a reference numeral in different figures represents the same element in the different figures.

An example of an implementation for graphical user interface 258 in FIG. 2 is shown in this figure. In this example, maintenance manager 214 displays part types 300 in graphical user interface 258. Further, maintenance manager 214 can display alert graphical indicator 302 in association with part type 228 in part types 300. Alert graphical indicator 302 is a graphical representation of alert 240 in FIG. 2 and visually indicates alert 240 in graphical user interface 258. In this example, the display of alert graphical indicator 302 in association with part type 228 means that the display of alert graphical indicator 302 is such that attention is drawn to part type 228 in graphical user interface 258.

In the illustrative example, a graphical indicator can include at least one of an icon, a pictogram, an ideogram, a graphic, an image, text, animation, bolding, a color, a line, an arrow, or other suitable graphic. In other words, the graphical indicator can be a single graphical element or combination of different graphical elements.

In this illustrative example, maintenance manager 214 can display table 305 in graphical user interface 258. With this example, part types 300 can be displayed in rows 306 in graphical user interface 258. No fault found related information 308 can be displayed in columns 310. No fault found related information 308 can include at least one of a shop count, a no fault found count, average fix time, no fault found percent, or other information.

As another example, maintenance manager 214 can display graph 320 in graphical user interface 258. Maintenance manager 214 can display at least one a shop count, a no fault found count, average fix time, or no fault found percent over selected periods of time in graph 320 in response to a selection of the part type.

As another example, maintenance manager 214 can display no fault found percent 330 for part type 304 in the graphical user interface 258 using no fault found graphical indicator 332. In this example, no fault found graphical indicator 332 comprises graphical elements that include number 334 representing no fault found percent 330 and trend line 336 representing a trend for the no fault found percent 330.

Maintenance manager 214 can also enable drilling down to more detailed information. For example, maintenance manager 214 can display percent change 338 in the trend over a selected period of time in graphical user interface 258 in response to a selection of the no fault found graphical indicator 332.

In this illustrative example, graphical user interface 258 provides a visualization of information through the use of graphical elements in the form of graphical indicators. These graphical indicators can be displayed in association with information such as information about parts displayed in the graphical user interface. These graphical indicators can enable a human operator to more quickly comprehend information about parts displayed in the graphical user interface in contrast merely displaying text in tables.

In these illustrative examples, the graphical indicators used can provide information about no fault found parts such alerts that part types for the no fault found parts may need further analysis. Further, the alerts are generated in a manner to indicate that the no fault found parts pulled from the aircraft may not have contributed to fixing the problem. For example, employing parts to perform maintenance in response to a fault indicator generated by an aircraft, more than one part can be pulled and replaced. Some of these parts can be pulled and replaced to perform maintenance specifically for the fall indicator. In other parts can be pulled to perform other maintenance.

Additionally, the alerts can also indicate that the replacement of the parts for the part type fix the problem even though these parts have been identified as no fault found. Further, a percentage of no fault found parts, trendlines, and other information can be graphically displayed in a manner that is more easily received and understood by the human operator as compared to merely displaying text. The graphical indicators in the illustrative examples provide indications of not just information about part types but identify situations in which further examination of part types is needed.

Illustration of the different graphical elements for displaying maintenance information and alerts in graphical user interface 258 in FIG. 2 is intended illustrate alerts that can be displayed for part types. This illustration is not meant to limit the manner in which other illustrative examples can be implemented. In other examples, other types of information can be displayed in addition to or in place of the information affected. For example, aircraft parts for a particular part type can be displayed for that particular part type. In this example, aircraft parts for parts that have the same number. In some cases, parts in the same part type can have different part numbers representing different versions of a part. Further, no fault found related information 308 can also be displayed for the particular parts in a part type.

In still other illustrative examples, other information such as recommendations on actions to be taken with respect to parts having alerts indicated by alert graphical indicator 302 or no fault found graphical indicator 332 can be made in graphical user interface 258 by maintenance manager 214.

For example, the recommendation can be to analyze at least one of the current maintenance procedure or the current testing procedure used for part type 228. Actions that can be taken can result in at least one of a new maintenance procedure or a new testing procedure for part type 228. The new maintenance procedure can be an entirely new procedure or an update or modification to the current maintenance procedure for part type 228. The new testing procedure also can be an entirely new procedure or an update or modification to the current testing procedure for part type 228.

For example, actions can be taken to update maintenance procedures as to what parts to pull and replace. Further, actions can also be taken to update testing procedures for parts that have been pulled for testing.

With at least one of a new maintenance procedure or a new testing procedure for part type 228, a reduction can occur in the number of parts that are pulled and replaced. This reduction can occur through improved identification of which parts should be pulled or replaced based on the analysis of no fault found parts for which alerts have been generated. Additionally, parts that actually need maintenance can be identified rather than being returned to a pool of parts for reuse. As a result, less time and expense can occur in performing maintenance for plurality of aircraft 224.

In one illustrative example, one or more technical solutions are present that overcome a technical problem with managing aircraft maintenance in a manner that takes into account occurrences of no fault found parts. As a result, one or more solutions can enable identifying when a particular part type has occurrences of no fault found for parts in the part type or are sufficient to warrant further analysis. In the illustrative examples, an alert is generated when occurrences of no fault found for parts in a part type exceed thresholds identified for generating alerts. Further, thresholds also can be used to avoid the generation of an alert when insufficient data is present for a particular part type.

Computer system 212 can be configured to perform at least one of the steps, operations, or actions described in the different illustrative examples using software, hardware, firmware or a combination thereof. As a result, computer system 212 operates as a special purpose computer system in which maintenance manager 214 in computer system 212 enables managing aircraft parts in which no fault found parts are present. In particular, maintenance manager 214 transforms computer system 212 into a special purpose computer system as compared to currently available general computer systems that do not have maintenance manager 214.

In the illustrative example, the use of maintenance manager 214 in computer system 212 integrates processes into a practical application for managing aircraft parts as compared to current part management systems. In other words, maintenance manager 214 in computer system 212 is directed to a practical application of processes integrated into maintenance manager in computer system 212 that determines a no fault found parameter and an average fix time parameter. These parameters are used to determine whether an alert should be generated with respect to no fault found occurrences for that part type. These parameters can be used to determine whether the no fault found parameter and the average fix time parameter, or both, exceed thresholds.

In this illustrative example, the threshold for the no fault found parameter is a level that indicates that parts being removed of the part type do not need maintenance. The threshold for the fix time parameter is at a level that indicates that parts being removed of the part type fix the issue for the part type. When both of these parameters exceed thresholds, an indication is present that parts of the part type by being pulled and replaced that are good parts and that pulling and replacing the parts fixes the problem. When both of these conditions are present, the maintenance that pulls and replaces the parts of the part type may not be for a part that needs to be fixed or repaired. Alternatively, the testing procedure for parts of the part type may be incorrect and may need revisions.

The illustration of the different components in maintenance environment 200 in in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, maintenance manager 214 can also schedule maintenance for plurality of aircraft 224 in addition to analyzing maintenance data 220. In other illustrative examples, part type 228 can be for parts for vehicles than aircraft parts 229. For example, part type 228 can be for parts for a vehicle selected from a group comprising a mobile platform, a surface ship, a tank, a personnel carrier, a train, a spacecraft, a submarine, a bus, an automobile, and other suitable types of vehicles.

Figure 4:
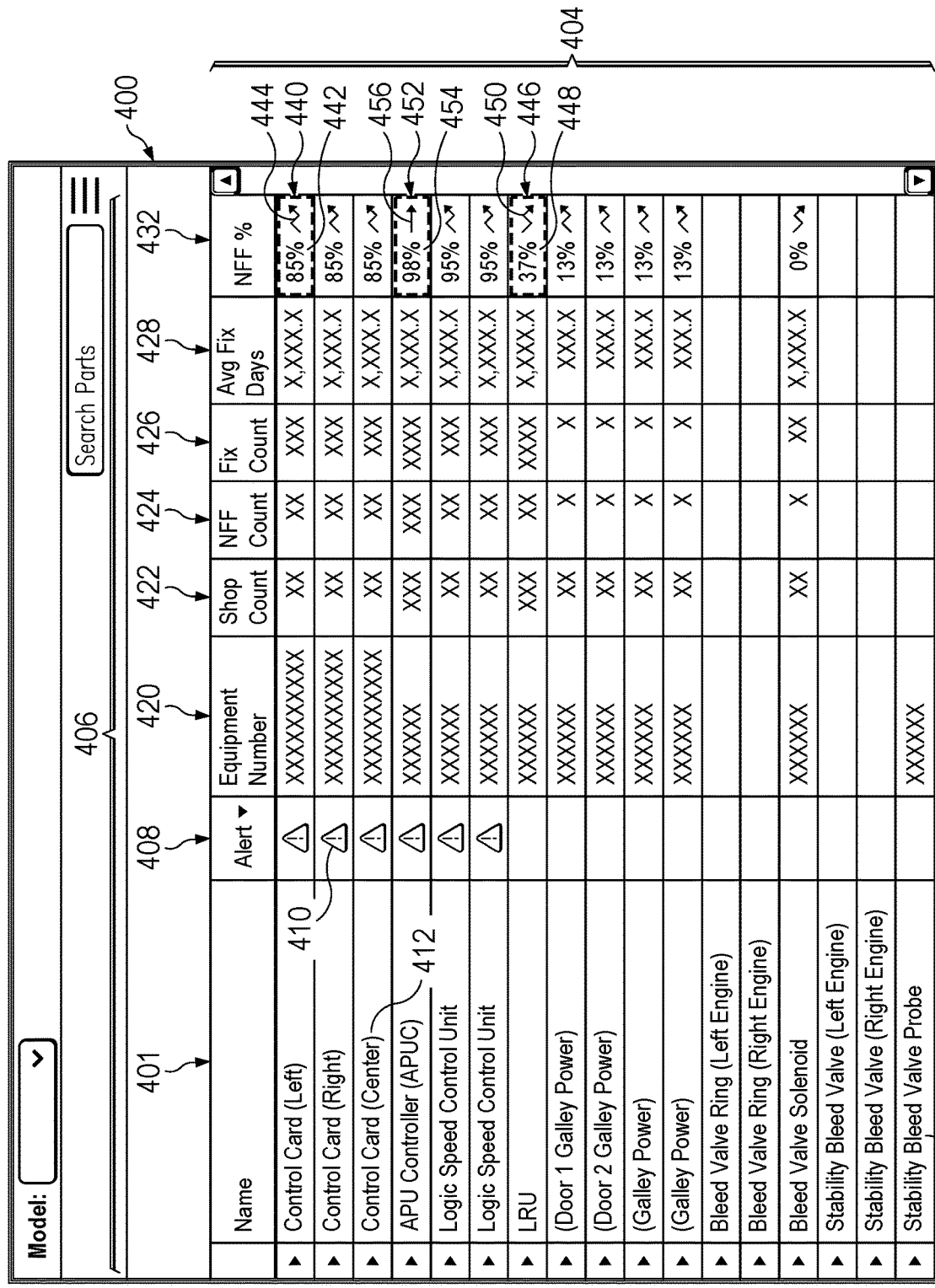
FIG. 4 is an illustration of a graphical user interface displaying alerts for part types in accordance with an illustrative embodiment.

Turning now to FIG. 4, an illustration of a graphical user interface displaying alerts for part types is depicted in accordance with an illustrative embodiment. In this illustrative example, graphical user interface 400 is an example of one implementation for graphical user interface 258 in FIG. 2 and FIG. 3.

As depicted, table 402 is displayed within graphical user interface 400. Table 402 is an example of an implementation for table 305 in FIG. 3.

As depicted, table 402 comprises rows 404 and columns 406. As depicted, part types are illustrated for multiple aircraft.

In this example, alerts are graphically displayed in alert column 408. When an alert regarding a no fault found is generated, this alert is displayed in alert column 408 for a particular part type using an alert graphical indicator. For example, graphical alert indicator 410 is displayed in alert column 408 in row 412 for the part type, control card (center).

In this example, no fault found related information is also displayed in the columns. For example, equipment number column 420 identifies can identify a part type. The equipment number can be the same for a part type that can be used in different locations.

In this example, name column 401 identifies the part type. Shop count column 422 identifies the number of parts removed and replaced for a part type. NFF count column 424 identifies the number of parts that were identified as no fault found after testing, and fix count column 426 identifies how many times the removal and replacement of the part fixed or resolved the problem. Average fix days column 428 is the average number of days that parts that were removed and replaced fix the problem.

Further, table 402 also includes no fault found percent column 432. This column includes no fault found graphical indicators that indicate the percent of parts in a part type that were found to be no fault found parts. Further, these graphical indicators also indicate a trend for the percentage.

For example, no fault found graphical indicator 440 has graphical elements comprising number 442 identifying the no fault found percentage as 85% and trendline 444 indicating an upward trend in the percent of no fault found parts. In another example, no fault found graphical indicator 446 has graphical elements comprising number 448 identifying the no fault found percentage as 37% and trendline 450 indicating a downward trend in the percent of no fault found parts.

In yet another illustrative example, no fault found graphical indicator 452 has graphical elements comprising number 454 identifying the no fault found percentage as 96% and trendline 456 indicating a downward trend in the percent of no fault found parts. In absence of a graphical indicator in no fault found percent column 432 indicates that insufficient data is present to provide accurate information.

Figure 5:
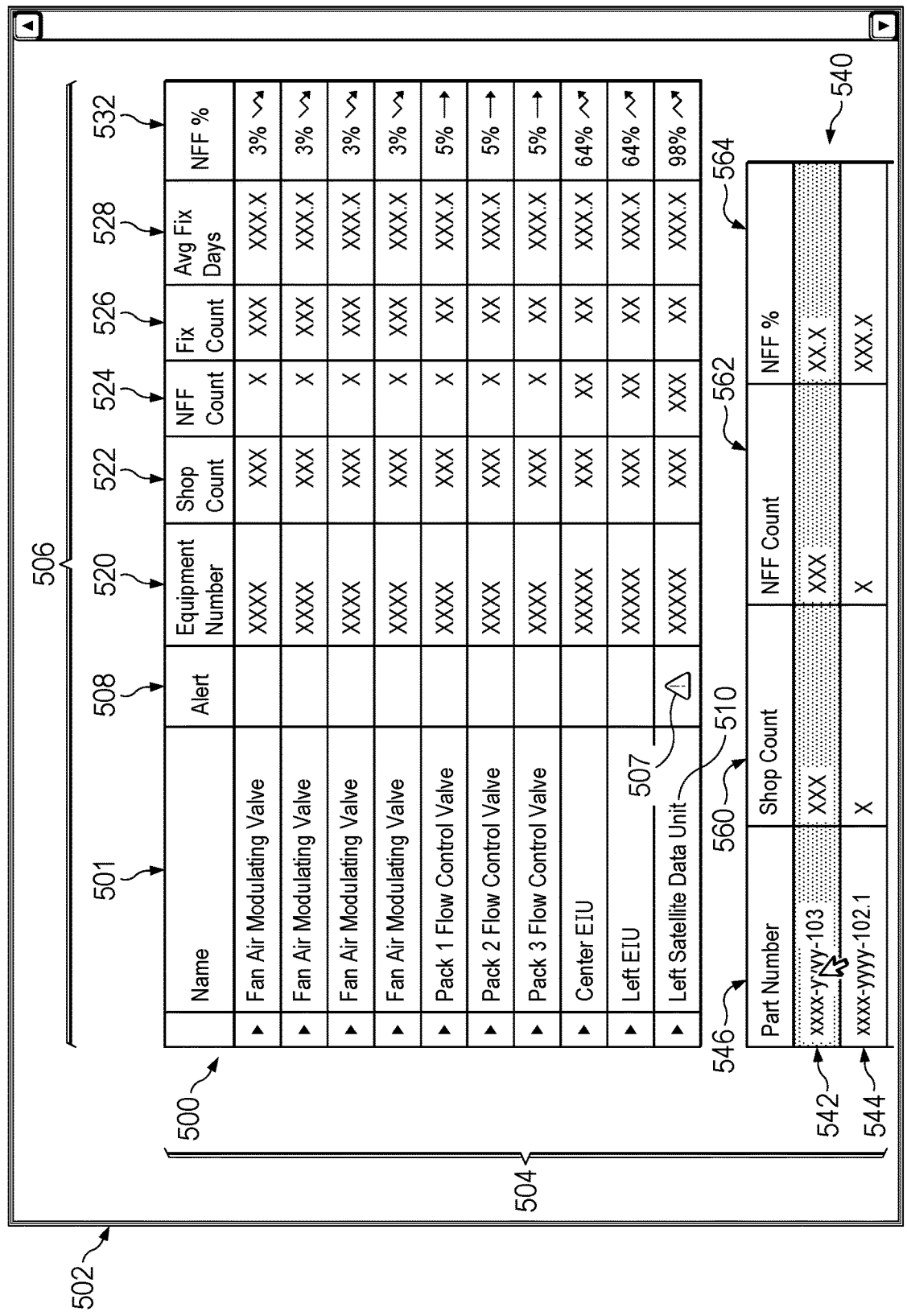
FIG. 5 is an illustration of a graphical user interface displaying part information for a part type in accordance with an illustrative embodiment.

With reference to FIG. 5, an illustration of a graphical user interface displaying part information for a part type is depicted in accordance with an illustrative embodiment. In this illustrative example, table 500 is displayed in graphical user interface 502. Graphical user interface 502 is an example of an implementation for graphical user interface 258 in FIG. 2 and FIG. 3. Table 500 is an example of an implementation for table 305 in FIG. 3.

In this example, table 500 comprises rows 504 and columns 506. As depicted, part types are illustrated for multiple aircraft.

In this example, graphical alert indicator 507 is displayed in alert column 508 for an alert for the part type in row 510. The part type in this example is a left satellite data unit. In this example, the part type is identified in name column 501.

In this example, no fault found related information is displayed in equipment number column 520, shop count column 522, NFF count column 524, fix count column 526, and average fix days column 528. Further, no fault found percent column 532 has no fault found graphical indicators for part types that have sufficient information for analysis.

In this illustrative example, additional information about parts in a part type can be displayed in response to a selection of the part-time. As depicted, the part type left satellite data unit in row 510 has been selected by a user input. In response to the selection of this part type, window 540 is displayed with information about the parts in this part type.

As depicted, window 540 has row 542 and row 544 corresponding to parts with specific part numbers in part number column 546. In this example, row 542 represents first parts with part number xxxx-yyyyy-103 and row 542 is for second parts with part number xxxx-yyyyy-102. In this example, these parts are different versions of each other.

Additionally, window 540 also has the shop count for parts in shop count column 560, the NFF count for the parts in NFF count column 562, and the NFF percent in NFF percent column 564.

Figure 6:
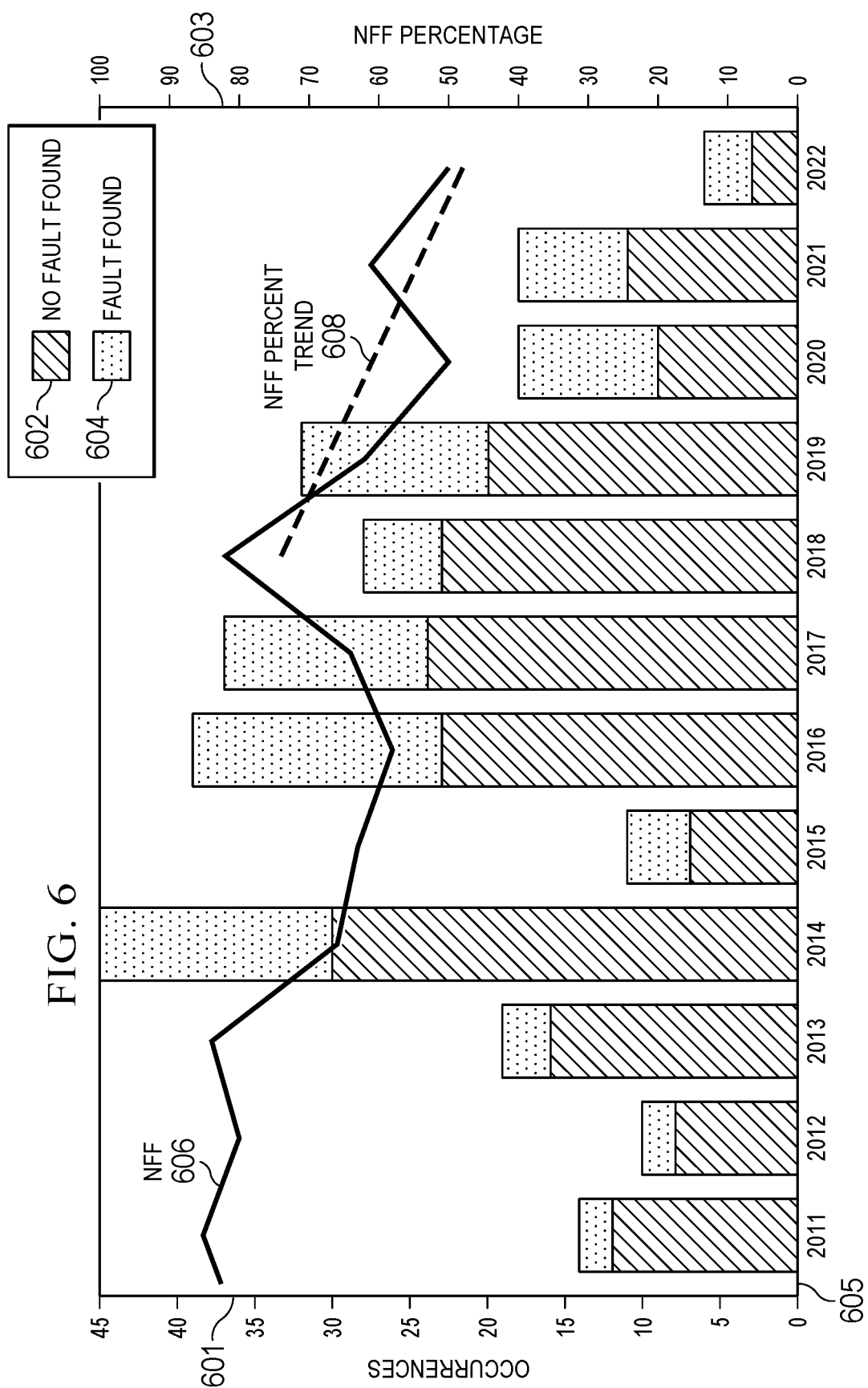
FIG. 6 is an illustration of a graph of no fault found related information for a part type in accordance with an illustrative embodiment.

With reference next to FIG. 6, an illustration of a graph of no fault found related information for a part type is depicted in accordance with an illustrative embodiment. In this illustrative example, graph 600 is an example of graph 320 and FIG. 3. In this depicted example, graph 600 is a bar graph identifying no fault found related information over 12 years for parts in a part type that is a satellite antenna. Graph 600 can be displayed in response to a selection of a satellite antenna part type in a table such as table 402 in FIG. 4.

In this example, y-axis 601 is occurrences of a no fault found, and y-axis 603 is no fault found percentage. X-axis 605 is years.

The no fault found information graphically displayed in graph 600 includes no fault found occurrences 602, fault found occurrences 604, NFF percent 606, and NFF percent trend 608.

Figure 7:
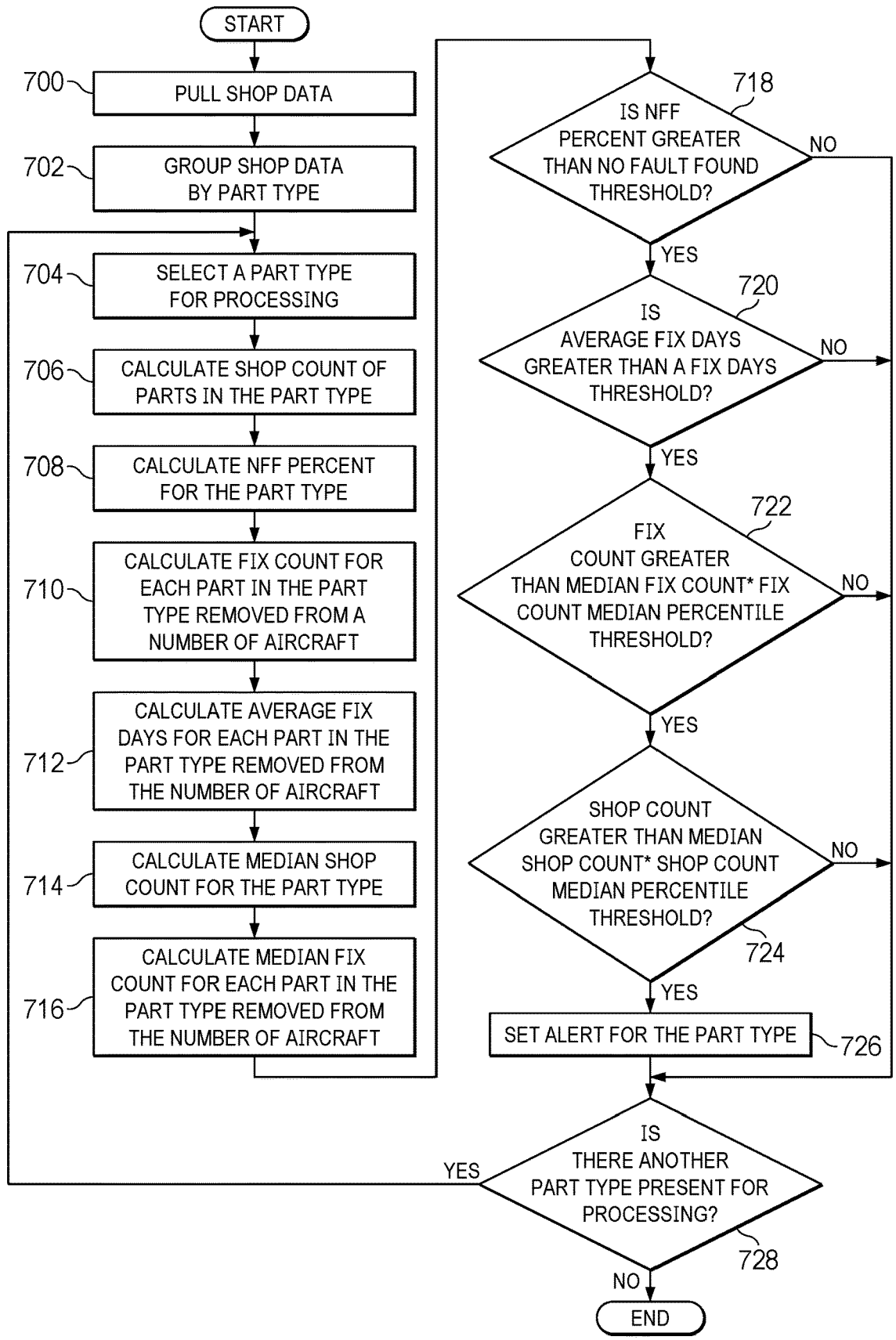
FIG. 7 is an illustration of a flowchart of a process for generating alerts for part types in accordance with an illustrative embodiment.

With reference next to FIG. 7, an illustration of a flowchart of a process for generating alerts for part types is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in maintenance manager 214 in computer system 212 in FIG. 2.

As depicted, the process begins by pulling shop data for analysis (operation 700). The process groups the shop data by part type (operation 702). The process selects a part type for processing (operation 704). In operation 704, the shop data for the selected part type is identified for use in determining no fault found information about the part type selected for processing.

The process calculates the shop count of parts in the part type (operation 706). In operation 706, the shop count is tracked for each instance of the part type in different aircraft. For example, a shop count is tracked for a part of the part type in an aircraft. Each time that part in the aircraft is removed and sent for testing, the shop count for that part is incremented. Thus, the shop count is present for each part of the part type in the aircraft.

The process calculates a no fault found (NFF) percent for the part type (operation 708). The process calculates a fix count for each part in the part type removed from a number of aircraft (operation 710). In operation 710, the fix count is performed on a per aircraft basis. For example, the number of times that the antenna is replaced on aircraft is the fix count for that part. In other words, the part type can be tracked based on the replacement of instances of aircraft parts of that part type in a particular aircraft. The particular aircraft identified using different identifiers such as a tail number.

The process calculates an average fix days for each part in the part type removed from the number of aircraft (operation 712).

The process calculates a median shop count for the part type (operation 714). The process calculates a median fix count for each part in the part type removed from the number of aircraft (operation 716).

The process determines whether the no fault found percentage (NFF %) is greater than a no fault found threshold (operation 718). If the no fault found percentage is greater than the no fault found threshold, the process determines whether the average fix days is greater than a fix days threshold (operation 720).

If the average fix days is greater than the fix days threshold, the process determines whether the fix count is greater than the median fix count multiplied by the median percentile threshold (operation 722).

If the fix count is greater than the median fix count multiplied by the fix count median percentile threshold, the process determines whether the shop count is greater than the median shop count multiplied by the shop count median percentile threshold (operation 724).

If the shop count is greater than the median shop count multiplied by the shop count median percentile threshold, the process sets an alert for the part type (operation 726). The process then determines whether another part type is present for processing (operation 728). If another part type is not present, the process terminates. On the other hand, if another part type is present for processing, the process returns to operation 704 as described above.

With reference again to operation 718, if the no fault found percentage is not greater than the no fault found threshold, the process proceeds operation 728 is described above. Turning back to operation 720, if the average fix days is not greater than the fix days threshold, the process proceeds operation 728 as described above. With reference again to operation 722, if the fix count is not greater than the median fix count multiplied by the median percentile threshold, the process also proceeds to operation 728. In a similar fashion with operation 724, if the shop count is not greater than the median fix count multiplied by the fix count median percentile threshold, the process proceeds operation 728.

Figure 8:
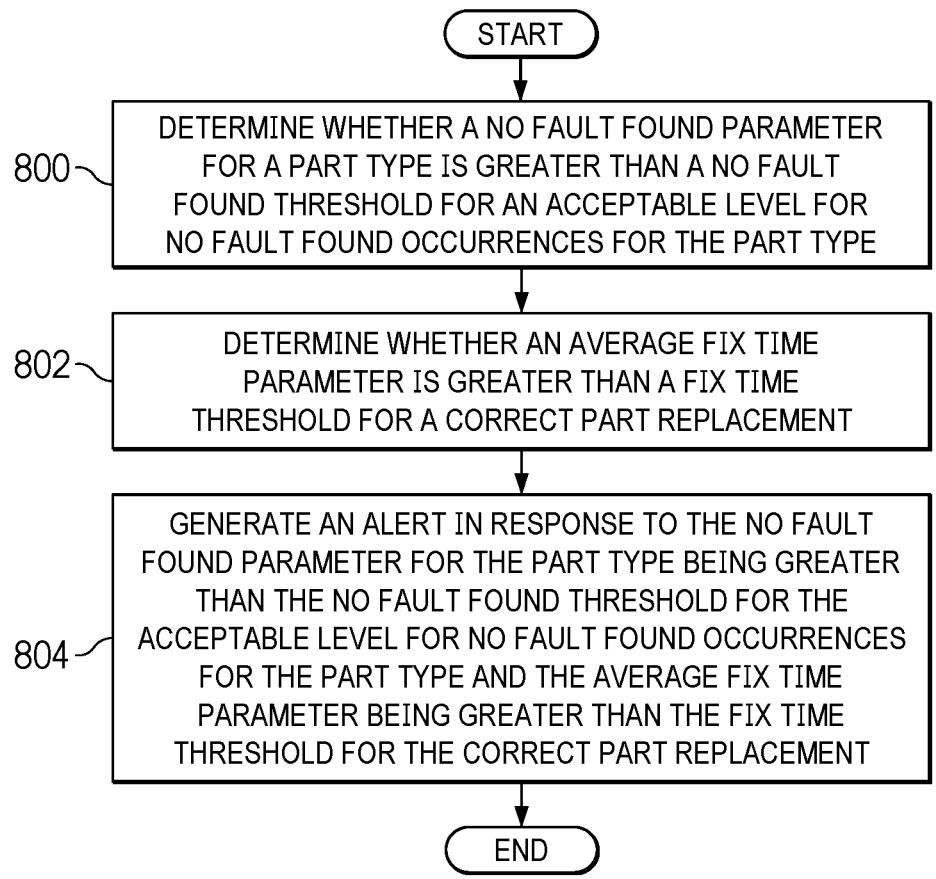
FIG. 8 is an illustration of a flowchart of a process for managing aircraft parts in accordance with an illustrative embodiment.

Turning next to FIG. 8, an illustration of a flowchart of a process for managing aircraft parts is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in maintenance manager 214 in computer system 212 in FIG. 2.

The process begins by determining whether a no fault found parameter for a part type is greater than a no fault found threshold for an acceptable level for no fault found occurrences for the part type (operation 800). In operation 800, the no fault found parameter is how often a no fault found for the part type occurs relative to a number of times that the part type has been removed and replaced. The no fault found parameter can take a number of different forms. For example, the no fault found parameter can be a number, a percentage, or some other form. When the no fault found parameter is a percentage, the no fault found parameter can be referred to as a no fault found percentage.

The process determines whether an average fix time parameter is greater than a fix time threshold for a correct part replacement (operation 802). In operation 802, the average fix time parameter identifies an average amount of time before a replaced part for the part type was replaced again. In one illustrative example, the time to be measured in days. The average fix time parameter can also be referred to as average fix time.

The process generates an alert in response to the no fault found parameter for the part type being greater than the no fault found threshold for the acceptable level for no fault found occurrences for the part type and the average fix time parameter being greater than the fix time threshold for the correct part replacement (operation 804). The process terminates thereafter.

Figure 9:
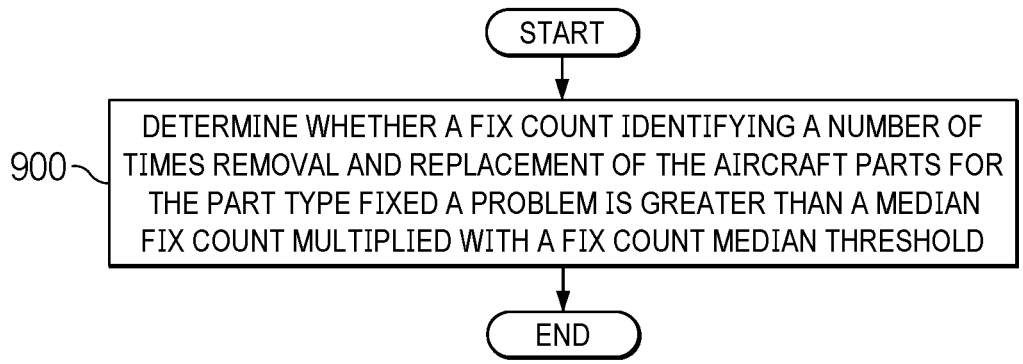
FIG. 9 is an illustration of a flowchart of process for generating an alert in accordance with an illustrative embodiment.

With reference next to FIG. 9, an illustration of a flowchart of process for generating an alert is depicted in accordance with an illustrative embodiment. The process illustrated in FIG. 9 is an example of an additional operation that can be performed with the operations in FIG. 8.

The process determines whether a fix count identifying a number of times removal and replacement of the aircraft parts for the part type fixed a problem is greater than a median fix count multiplied with a fix count median threshold (operation 900). The process terminates thereafter.

Figure 10:
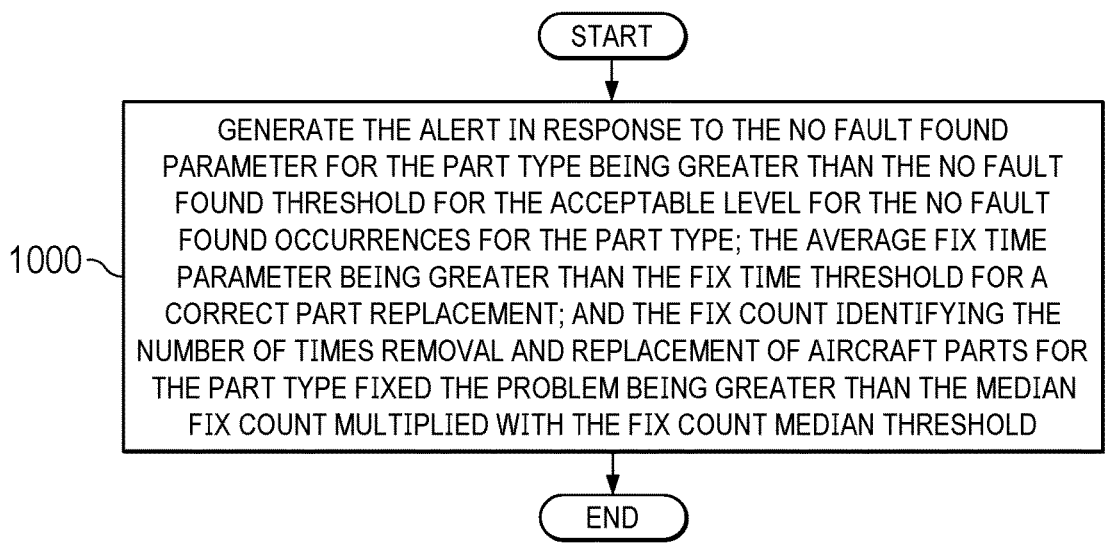
FIG. 10 is an illustration of a flowchart of process for generating an alert in accordance with an illustrative embodiment.

Turning to FIG. 10, an illustration of a flowchart of process for generating an alert is depicted in accordance with an illustrative embodiment. The process illustrated in FIG. 9 is an example of an implementation of operation 804 in FIG. 8 when operation 900 in FIG. 9 is used.

The process generates the alert in response to the no fault found parameter for the part type being greater than the no fault found threshold for the acceptable level for the no fault found occurrences for the part type; the average fix time parameter being greater than the fix time threshold for a correct part replacement; and the fix count identifying the number of times removal and replacement of aircraft parts for the part type fixed the problem being greater than the median fix count multiplied with the fix count median threshold (operation 1000). The process terminates thereafter.

Figure 11:
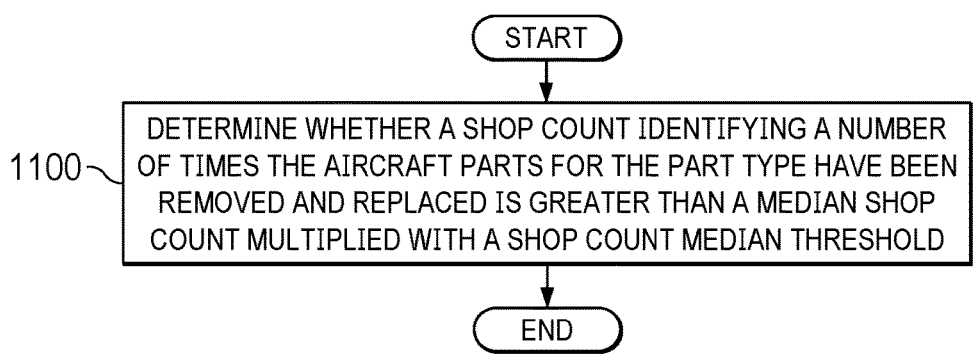
FIG. 11 is an illustration of a flowchart of process for generating an alert in accordance with an illustrative embodiment.

With reference next to FIG. 11, an illustration of a flowchart of process for generating an alert is depicted in accordance with an illustrative embodiment. The process illustrated in FIG. 11 is an example of an additional operation that can be performed with the operations in FIG. 8.

The process determines whether a shop count identifying a number of times the aircraft parts for the part type have been removed and replaced is greater than a median shop count multiplied with a shop count median threshold (operation 1100). The process terminates thereafter.

Figure 12:
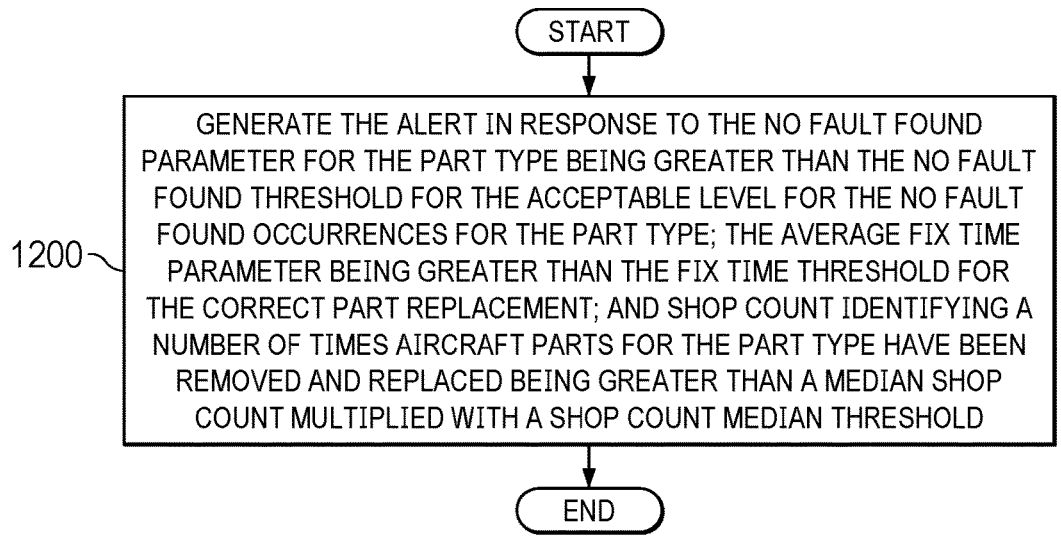
FIG. 12 is an illustration of a flowchart of process for generating an alert in accordance with an illustrative embodiment.

Turning to FIG. 12, an illustration of a flowchart of process for generating an alert is depicted in accordance with an illustrative embodiment. The process illustrated in FIG. 12 is an example of an implementation of operation 804 in FIG. 8 when operation 1100 in FIG. 11 is used.

The process generates the alert in response to the no fault found parameter for the part type being greater than the no fault found threshold for the acceptable level for the no fault found occurrences for the part type; the average fix time parameter being greater than the fix time threshold for the correct part replacement; and shop count identifying a number of times aircraft parts for the part type have been removed and replaced being greater than a median shop count multiplied with a shop count median threshold (operation 1200). The process terminates thereafter.

Figure 13:
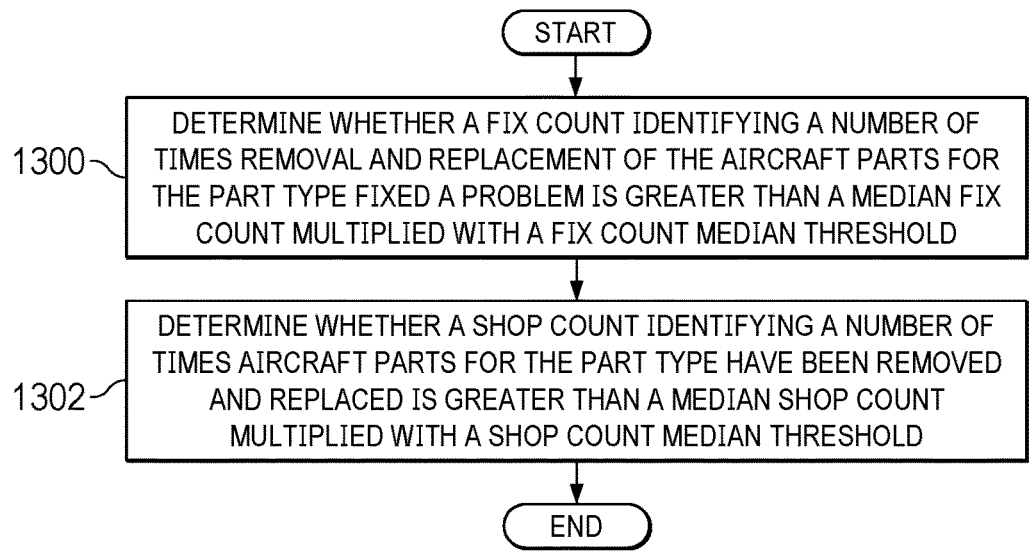
FIG. 13 is an illustration of a flowchart of process for generating an alert in accordance with an illustrative embodiment.

With reference next to FIG. 13, an illustration of a flowchart of process for generating an alert is depicted in accordance with an illustrative embodiment. The process illustrated in FIG. 13 is an example of an additional operation that can be performed with the operations in FIG. 8.

The process begins by determining whether a fix count identifying a number of times removal and replacement of the aircraft parts for the part type fixed a problem is greater than a median fix count multiplied with a fix count median threshold (operation 1300). The process determines whether a shop count identifying a number of times aircraft parts for the part type have been removed and replaced is greater than a median shop count multiplied with a shop count median threshold (operation 1302). The process terminates thereafter.

Figure 14:
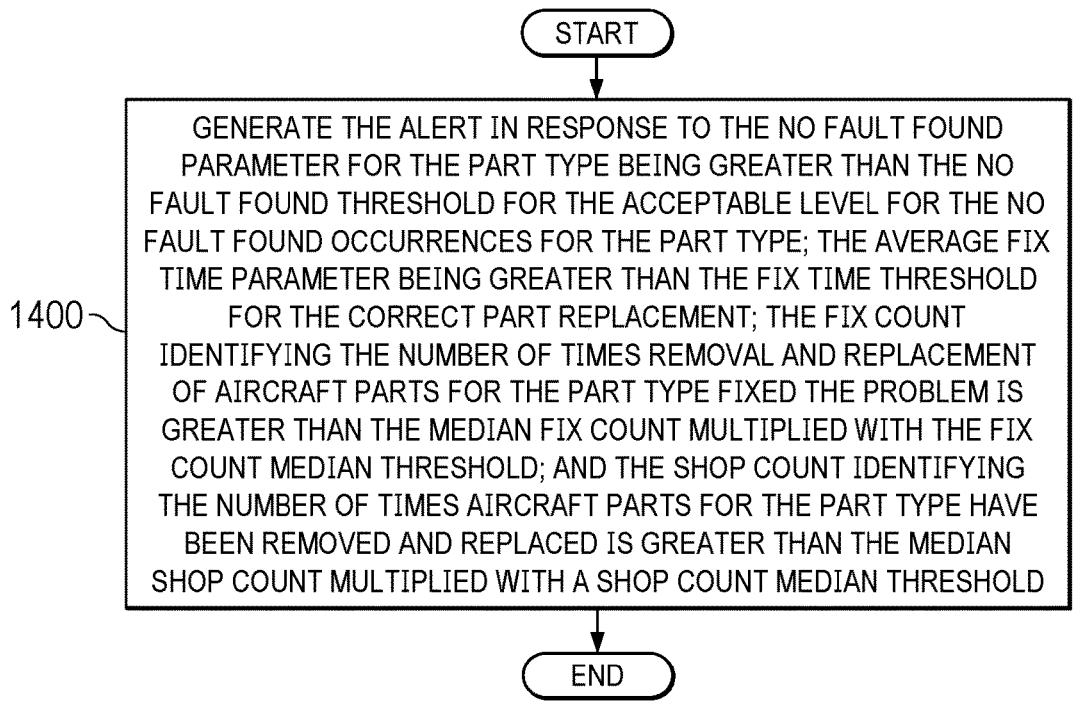
FIG. 14 is an illustration of a flowchart of process for generating an alert in accordance with an illustrative embodiment.

Turning to FIG. 14, an illustration of a flowchart of process for generating an alert is depicted in accordance with an illustrative embodiment. The process illustrated in FIG. 14 is an example of an implementation of operation 804 in FIG. 8 when operation 1300 and operation 1302 in FIG. 13 are used.

The process generates the alert in response to the no fault found parameter for the part type being greater than the no fault found threshold for the acceptable level for the no fault found occurrences for the part type; the average fix time parameter being greater than the fix time threshold for the correct part replacement; the fix count identifying the number of times removal and replacement of aircraft parts for the part type fixed the problem is greater than the median fix count multiplied with the fix count median threshold; and the shop count identifying the number of times aircraft parts for the part type have been removed and replaced being greater than the median shop count multiplied with a shop count median threshold (operation 1400). The process terminates thereafter.

Figure 15:
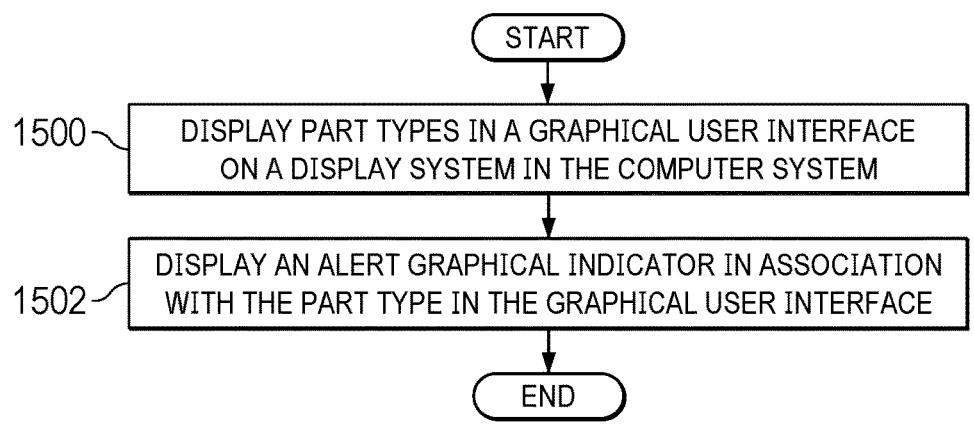
FIG. 15 is an illustration of a flowchart of a process for displaying an alert in accordance with an illustrative embodiment.

With reference now to FIG. 15, an illustration of a flowchart of a process for displaying an alert is depicted in accordance with an illustrative embodiment. The process in FIG. 15 can be implemented in hardware, software, or both. When implemented in software, the process can take the form of program instructions that are run by one of more processor units located in one or more hardware devices in one or more computer systems. For example, the process can be implemented in maintenance manager 214 in computer system 212 in FIG. 2.

The process begins by displaying part types in a graphical user interface on a display system in the computer system (operation 1500). The process displays an alert graphical indicator in association with the part type in the graphical user interface (operation 1502). The process terminates thereafter. In operation 1502, the alert graphic indicator visually indicates the alert in the graphical user interface.

Figure 16:
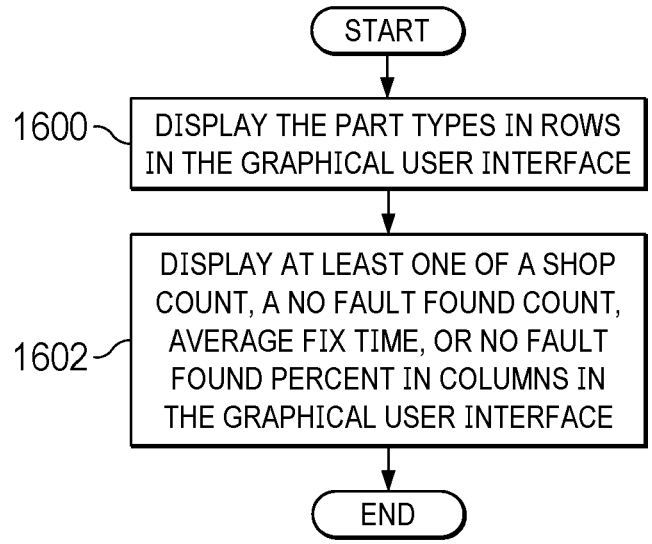
FIG. 16 is an illustration of a flowchart of a process for displaying no fault found related information in accordance with an illustrative embodiment.

In FIG. 16, an illustration of a flowchart of a process for displaying no fault found related information is depicted in accordance with an illustrative embodiment. The process illustrated in FIG. 16 is an example of additional operations that can be performed with the operations in FIG. 15.

The process begins by displaying the part types in rows in the graphical user interface (operation 1600). The process displays at least one of a shop count, a no fault found count, average fix time, or no fault found percent in columns in the graphical user interface (operation 1602). The process terminates thereafter. In operation 1602, the shop count, the no fault found count, the average fix time, and the no fault found percent are examples of no fault found related information.

Figure 17:
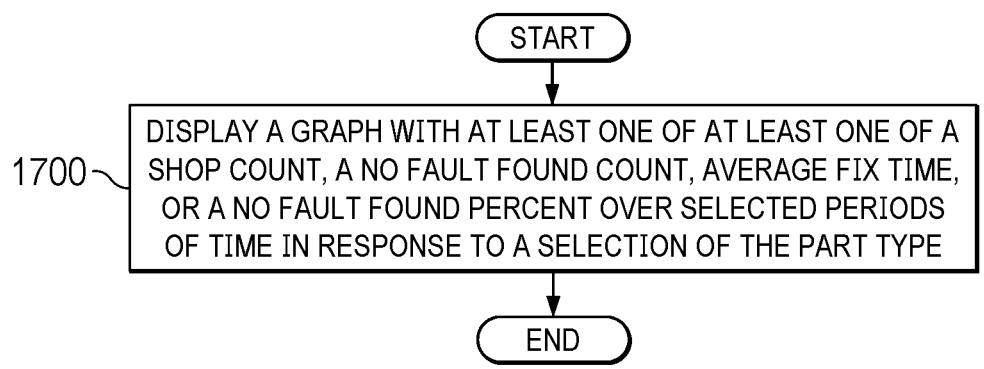
FIG. 17 is an illustration of a flowchart of a process for displaying no fault found related information in a graph in accordance with an illustrative embodiment.

Turning now to FIG. 17, an illustration of a flowchart of a process for displaying no fault found related information in a graph is depicted in accordance with an illustrative embodiment. The process illustrated in FIG. 17 is an example of additional operations that can be performed with the operations in FIG. 15.

The process displays a graph with at least one of a shop count, a no fault found count, average fix time, or a no fault found percent over selected periods of time in response to a selection of the part type (operation 1700). The process terminates thereafter. In operation 1700, the shop count, the no fault found count, the average fix time, and the no fault found percent are examples of no fault found related information.

Figure 18:
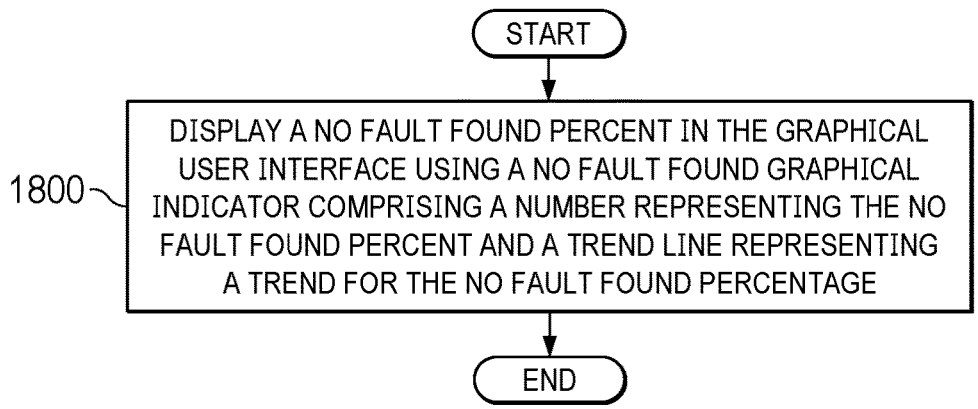
FIG. 18 is an illustration of a flowchart of a process for displaying a no fault found graphical indicator in accordance with an illustrative embodiment.

With reference next to FIG. 18, an illustration of a flowchart of a process for displaying a no fault found graphical indicator is depicted in accordance with an illustrative embodiment. The process illustrated in FIG. 18 is an example of additional operations that can be performed with the operations in FIG. 15.

The process displays a no fault found percent in the graphical user interface using a no fault found graphical indicator comprising a number representing the no fault found percent and a trend line representing a trend for the no fault found percentage (operation 1800). The process terminates thereafter.

Figure 19:
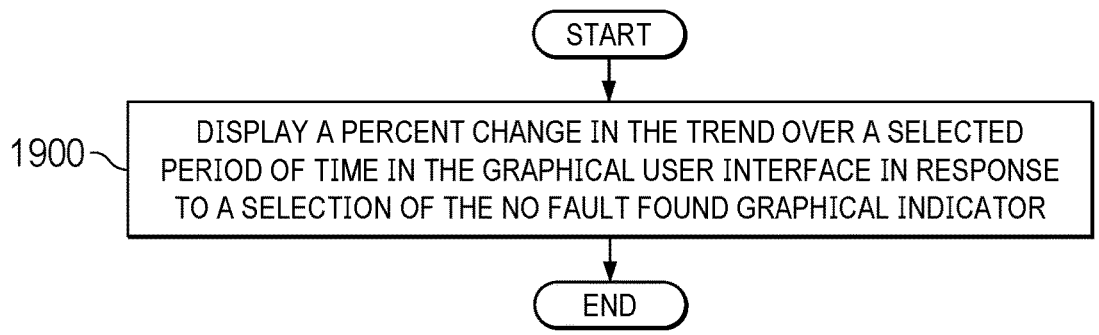
FIG. 19 is an illustration of a flowchart of a process for displaying a no fault found graphical indicator in accordance with an illustrative embodiment.

Next in FIG. 19, an illustration of a flowchart of a process for displaying a no fault found graphical indicator is depicted in accordance with an illustrative embodiment. The process illustrated in FIG. 19 is an example of additional operations that can be performed with the operations in FIG. 15.

The process displays a percent change in the trend over a selected period of time in the graphical user interface in response to a selection of the no fault found graphical indicator (operation 1900). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 722 and operation 724 in FIG. 7 are used to remove part types from consideration when insufficient data is present. In some illustrative examples, these determinations can be optional determinations.

Figure 20:
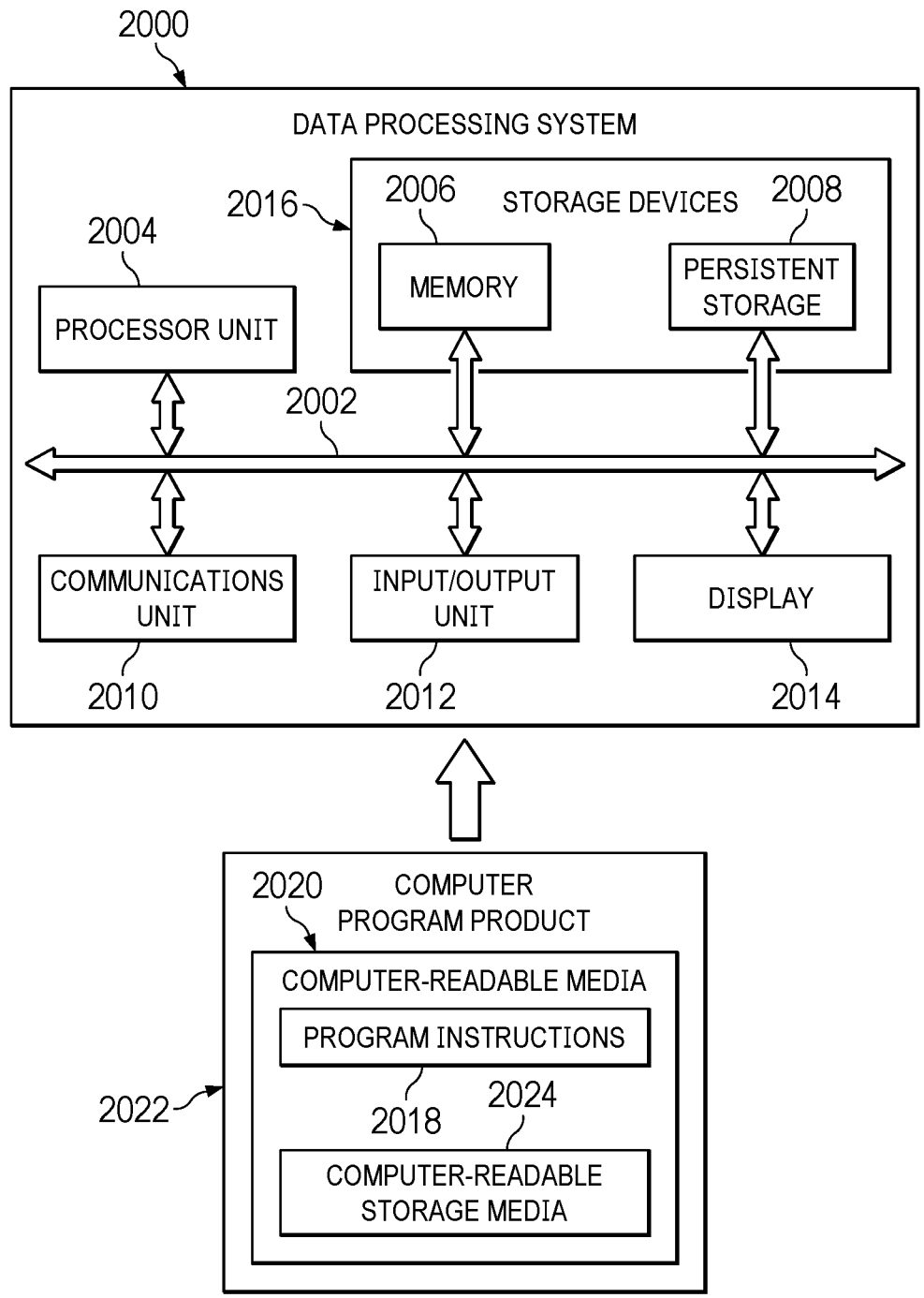
FIG. 20 is an illustration of a block diagram of a data processing system in accordance with an illustrative embodiment.

Turning now to FIG. 20, a block diagram of a data processing system is depicted in accordance with an illustrative embodiment. Data processing system 2000 can be used to implement server computer 104, server computer 106, client devices 110, in FIG. 1. Data processing system 2000 can also be used to implement computer system 212 in FIG. 2.

In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 may take various forms, depending on the particular implementation.

For example, persistent storage 2008 may 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 may provide a connection for user input through at least one of a keyboard, a mouse, or some other suitable input device. Further, input/output unit 2012 may send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which may be located in a memory, such as memory 2006.

These instructions are referred to as program instructions, computer usable program instructions, or computer-readable program instructions that can be read and executed by a processor in processor unit 2004. The program instructions in the different embodiments can be embodied on different physical or computer-readable storage media, such as memory 2006 or persistent storage 2008.

Program instructions 2018 are located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a medium that propagates or transmits program instructions 2018. Computer readable storage media 2024 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 2024, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in computer-readable storage media 2024.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, may be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Figure 21:
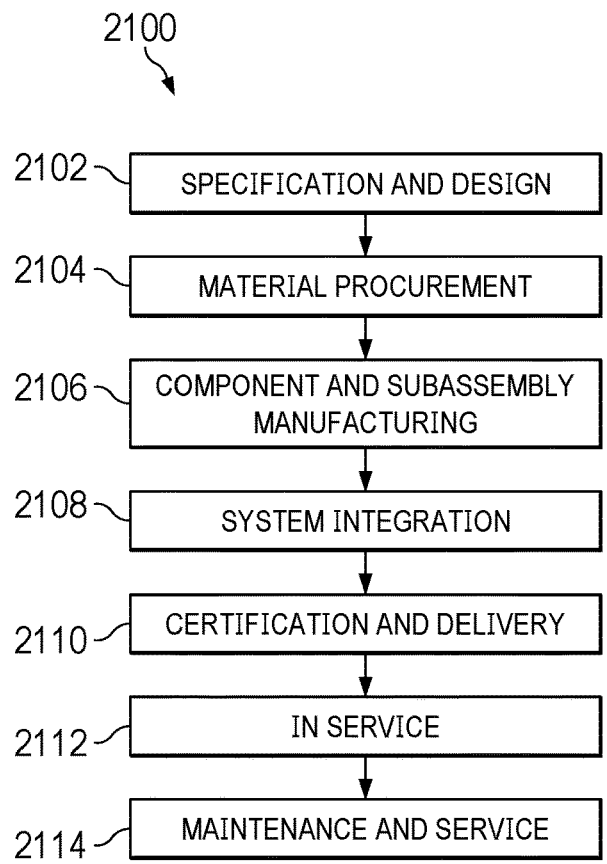
FIG. 21 is an illustration of an aircraft manufacturing and service method in accordance with an illustrative embodiment.
Figure 22:
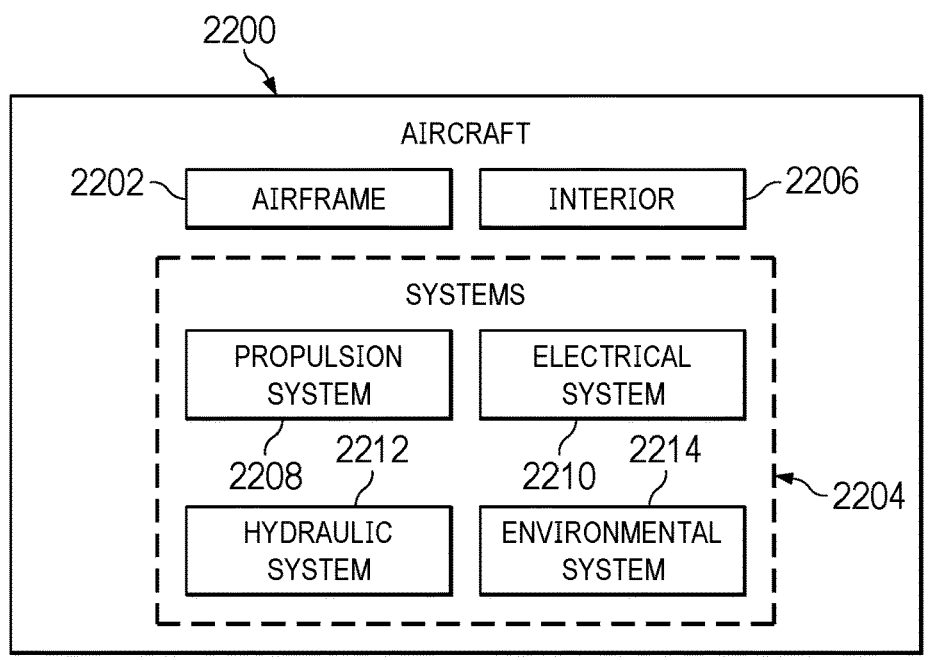
FIG. 22 is an illustration of a block diagram of an aircraft in which an illustrative embodiment may be implemented.

Illustrative embodiments of the disclosure may be described in the context of aircraft manufacturing and service method 2100 as shown in FIG. 21 and aircraft 2200 as shown in FIG. 22. Turning first to FIG. 21, an illustration of an aircraft manufacturing and service method is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 can go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft is depicted in which an illustrative embodiment may be implemented. In this example, aircraft 2200 is produced by aircraft manufacturing and service method 2100 in FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100 in FIG. 21.

In one illustrative example, components or subassemblies produced in component and subassembly manufacturing 2106 in FIG. 21 can be fabricated or manufactured in a manner similar to components or subassemblies produced while aircraft 2200 is in service 2112 in FIG. 21. As yet another example, one or more apparatus embodiments, method embodiments, or a combination thereof can be utilized during production stages, such as component and subassembly manufacturing 2106 and system integration 2108 in FIG. 21. One or more apparatus embodiments, method embodiments, or a combination thereof may be utilized while aircraft 2200 is in service 2112, during maintenance and service 2114 in FIG. 21, or both. The use of a number of the different illustrative embodiments may substantially expedite the assembly of aircraft 2200, reduce the cost of aircraft 2200, or both expedite the assembly of aircraft 2200 and reduce the cost of aircraft 2200.

For example, in one or more illustrative examples, maintenance manager 214 in FIG. 2 can reduce cost and time associated with pulling and replacing parts in maintenance and service 2114. Further, increased availability of aircraft during in service 2112 and reduction of time of aircraft in maintenance and service 2114 can occur through improved procedures in pulling and replacing parts based on the alerts generated by maintenance manager 214. In other words, actions can be taken to update maintenance procedures as to what parts to pull and replace. Further, actions can also be taken to adjust testing procedures for parts that have been pulled for testing.

Thus, the illustrative embodiments provide a method, apparatus, and computer program product for managing maintenance for vehicles such as aircraft. A computer system determines whether a no fault found parameter for a part type is greater than a no fault found threshold for an acceptable level for no fault found occurrences for the part type. The no fault found parameter is how often a no fault found for the part type occurs relative to a number of times that the part type has been removed and replaced. The computer system determines whether an average fix time parameter is greater than a fix time threshold for a correct part replacement. The average fix time parameter identifies an average amount of time before a replaced part for the part type was replaced again. The computer system generates an alert in response to the no fault found parameter for the part type being greater than the no fault found threshold for the acceptable level for no fault found occurrences for the part type and the average fix time parameter being greater than fix time threshold for the correct part replacement.

In the illustrative examples, the analysis of information regarding no fault found parts can be used to reduce cost and time in performing maintenance for aircraft. The illustrative examples can determine that a no fault found part may have been pulled unnecessarily as part of a maintenance procedure. The illustrative examples can also determine that a testing procedure resulting in finding a part is no fault found may be incorrect or lacking to accurately identify an issue with the part. Either or both of these situations can be present based on the alerts generated in the different illustrative examples. As a result, these alerts can be used to perform further investigations or analysis of at least one of maintenance procedures or testing procedures. The result of these investigations analysis can be the creation of at least one of a new maintenance procedure or a new testing procedure that reduces potential issues with having too many no fault found parts in inventory as spare parts.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing aircraft parts, the method comprising:
   receiving, by a computer system from a flight management system of an aircraft, a fault indicator for a part type of the aircraft;
   determining, by the computer system, whether a no fault found parameter for the part type is greater than a no fault found threshold for an acceptable level for no fault found occurrences for the part type, wherein the no fault found parameter is how often a no fault found for the part type occurs relative to a number of times that the part type has been removed and replaced;
   determining, by the computer system, whether an average fix time parameter is greater than a fix time threshold for a correct part replacement, wherein the average fix time parameter identifies an average amount of time before a replaced part for the part type was replaced again;
   generating, by the computer system, an alert in response to the no fault found parameter for the part type being greater than the no fault found threshold for the acceptable level for no fault found occurrences for the part type and the average fix time parameter being greater than fix time threshold for the correct part replacement;
   displaying, by the computer system, part types in a graphical user interface on a display system in the computer system; and
   displaying, by the computer system, an alert graphical indicator in association with the part type in the graphical user interface, wherein the alert graphic indicator visually indicates the alert in the graphical user interface.

2. The method of claim 1 further comprising:
   determining, by the computer system, whether a fix count identifying a number of times removal and replacement of the aircraft parts for the part type fixed a problem is greater than a median fix count multiplied with a fix count median threshold;
   wherein generating the alert comprises:
      generating, by the computer system, the alert in response to the no fault found parameter for the part type being greater than the no fault found threshold for the acceptable level for the no fault found occurrences for the part type; the average fix time parameter being greater than the fix time threshold for a correct part replacement; and the fix count identifying the number of times removal and replacement of aircraft parts for the part type fixed the problem being greater than the median fix count multiplied with the fix count median threshold.

3. The method of claim 1 further comprising:
   determining, by the computer system, whether a shop count identifying a number of times the aircraft parts for the part type have been removed and replaced being greater than a median shop count multiplied with a shop count median threshold;
   wherein generating the alert comprises:
      generating, by the computer system, the alert in response to the no fault found parameter for the part type being greater than the no fault found threshold for the acceptable level for the no fault found occurrences for the part type; the average fix time parameter being greater than the fix time threshold for the correct part replacement; and shop count identifying a number of times aircraft parts for the part type have been removed and replaced being greater than a median shop count multiplied with a shop count median threshold.

4. The method of claim 3 further comprising:
   determining, by the computer system, whether a fix count identifying a number of times removal and replacement of the aircraft parts for the part type fixed a problem is greater than a median fix count multiplied with a fix count median threshold;
   determining, by the computer system, whether a shop count identifying a number of times aircraft parts for the part type have been removed and replaced is greater than a median shop count multiplied with a shop count median threshold;
   wherein generating the alert comprises:
      generating, by the computer system, the alert in response to the no fault found parameter for the part type being greater than the no fault found threshold for the acceptable level for the no fault found occurrences for the part type; the average fix time parameter being greater than the fix time threshold for the correct part replacement; the fix count identifying the number of times removal and replacement of aircraft parts for the part type fixed the problem is greater than the median fix count multiplied with the fix count median threshold; and the shop count identifying the number of times aircraft parts for the part type have been removed and replaced being greater than the median shop count multiplied with a shop count median threshold.

5. The method of claim 1 further comprising:
   displaying, by the computer system, the part types in rows in the graphical user interface; and
   displaying, by the computer system, at least one of a shop count, a no fault found count, average fix time, or no fault found percent in columns in the graphical user interface.

6. The method of claim 1 further comprising:
   displaying, by the computer system, a graph with at least one of a shop count, a no fault found count, average fix time, or a no fault found percent over selected periods of time in the graphical user interface in response to a selection of the part type.

7. The method of claim 1 further comprising:
   displaying, by the computer system, a no fault found percent in the graphical user interface using a no fault found graphical indicator comprising a number representing the no fault found percent and a trend line representing a trend for the no fault found percentage.

8. The method of claim 7 further comprising:
   displaying, by the computer system, a percent change in the trend over a selected period of time in the graphical user interface in response to a selection of the no fault found graphical indicator.

9. An aircraft maintenance system comprising:
   a computer system; and
   a maintenance manager in the computer system, wherein the maintenance manager is configured to:
      determine whether a no fault found parameter for a part type is greater than a no fault found threshold for an acceptable level for no fault found occurrences for the part type, wherein the no fault found parameter is how often a no fault found for the part type occurs relative to a number of times the part type has been removed and replaced;
      determine whether an average fix time parameter is greater than a fix time threshold for a correct part replacement, wherein the average fix time parameter identifies an average amount of time before a replaced aircraft part for the part type was replaced again;

generate an alert in response to the no fault found parameter for the part type being greater than the no fault found threshold for the acceptable level for no fault found occurrences for the part type and the average fix time parameter being greater than the fix time threshold for the correct part replacement;

display part types in a graphical user interface on a display system in the computer system; and display an alert graphical indicator in association with the part type in the graphical user interface, wherein the alert graphic indicator visually indicates the alert in the graphical user interface.

10. The aircraft maintenance system of claim 9, wherein the maintenance manager is configured to:

determine whether a fix count identifying a number of times removal and replacement of the aircraft parts for the part type fixed a problem is greater than a median fix count multiplied with a fix count median threshold;

wherein generating the alert comprises:

generate the alert in response to the no fault found parameter for the part type being greater than the no fault found threshold for the acceptable level for the no fault found occurrences for the part type; the average fix time parameter being greater than the fix time threshold for a correct part replacement; and the fix count identifying the number of times removal and replacement of aircraft parts for the part type fixed the problem being greater than the median fix count multiplied with the fix count median threshold.

11. The aircraft maintenance system of claim 9, wherein the maintenance manager is configured to:

determine whether a shop count identifying a number of times the aircraft parts for the part type have been removed and replaced is greater than a median shop count multiplied with a shop count median threshold;

wherein in generating the alert, the maintenance manager is configured to:

generate the alert in response to the no fault found parameter for the part type being greater than the no fault found threshold for the acceptable level for the no fault found occurrences for the part type; the average fix time parameter being greater than the fix time threshold for the correct part replacement; and shop count identifying a number of times aircraft parts for the part type have been removed and replaced being greater than a median shop count multiplied with a shop count median threshold.

12. The aircraft maintenance system of claim 11, wherein the maintenance manager is configured to:

determine whether a fix count identifying a number of times removal and replacement of the aircraft parts for the part type fixed a problem is greater than a median fix count multiplied with a fix count median threshold;

determine whether a shop count identifying a number of times aircraft parts for the part type have been removed and replaced is greater than a median shop count multiplied with a shop count median threshold;

wherein in generating the alert, the maintenance manager is configured to:

generate the alert in response to the no fault found parameter for the part type being greater than the no fault found threshold for the acceptable level for the no fault found occurrences for the part type; the average fix time parameter being greater than the fix time threshold for the correct part replacement; the fix count identifying the number of times removal and replacement of aircraft parts for the part type fixed the problem is greater than the median fix count multiplied with the fix count median threshold; and the shop count identifying the number of times aircraft parts for the part type have been removed and replaced being greater than the median shop count multiplied with a shop count median threshold.

13. The aircraft maintenance system of claim 9, wherein the maintenance manager is configured to:

display the part types in rows in the graphical user interface; and display at least one of a shop count, a no fault found count, average fix time, or no fault found percent in columns in the graphical user interface.

14. The aircraft maintenance system of claim 9, wherein the maintenance manager is configured to:

display a graph with at least one of at least one of a shop count, a no fault found count, average fix time, or a no fault found percent over selected periods of time in the graphical user interface in response to a selection of the part type.

15. The aircraft maintenance system of claim 9, wherein the maintenance manager is configured to:

display a no fault found percent in the graphical user interface using a no fault found graphical indicator comprising a number representing the no fault found percent and a trend line representing a trend for the no fault found percentage.

16. The aircraft maintenance system of claim 15, wherein the maintenance manager is configured to:

display a percent change in the trend over a selected period of time in the graphical user interface in response to a selection of the no fault found graphical indicator.

17. A computer program product for managing aircraft parts, the computer program product comprising a computer readable storage media having program instructions embodied therewith, the program instructions executable by a computer system to cause the computer system to perform a method of:

determining whether a no fault found parameter for a part type is greater than a no fault found threshold for an acceptable level for no fault found occurrences for the part type, wherein the no fault found parameter is how often a no fault found for the part type occurs relative to a number of times the part type has been removed and replaced;

determining whether an average fix time parameter is greater than a fix time threshold for a correct part replacement, wherein the average fix time parameter identifies an average amount of time before a replaced part for the part type was replaced again;

generating an alert in response to the no fault found parameter for the part type being greater than the no fault found threshold for the acceptable level for no fault found occurrences for the part type and the average fix time parameter being greater than the fix time threshold for the correct part replacement;

display part types in a graphical user interface on a display system in the computer system; and display an alert graphical indicator in association with the part type in the graphical user interface, wherein the alert graphic indicator visually indicates the alert in the graphical user interface.

18. A vehicle maintenance system comprising:
a computer system; and
a maintenance manager in the computer system, wherein the maintenance manager is configured to:
- determine whether a no fault found parameter for a part type is greater than a no fault found threshold for an acceptable level for no fault found occurrences for the part type, wherein the no fault found parameter is how often a no fault found for the part type occurs relative to a number of times the part type has been removed and replaced;
- determine whether an average fix time parameter is greater than a fix time threshold for a correct part replacement, wherein the average fix time parameter identifies an average amount of time before a replaced vehicle part for the part type was replaced again;
- generate an alert in response to the no fault found parameter for the part type being greater than the no fault found threshold for the acceptable level for no fault found occurrences for the part type and the average fix time parameter being greater than the fix time threshold for the correct part replacement;

display part types in a graphical user interface on a display system in the computer system; and display an alert graphical indicator in association with the part type in the graphical user interface, wherein the alert graphic indicator visually indicates the alert in the graphical user interface.

* * * * *